United States Patent
Benson et al.

(10) Patent No.: US 12,095,744 B2
(45) Date of Patent: *Sep. 17, 2024

(54) MUTUAL KEY MANAGEMENT SERVICE SYSTEM AND METHOD

(71) Applicant: TrustFour Technologies, Inc., San Diego, CA (US)

(72) Inventors: Glenn Stuart Benson, Newton, MA (US); Robert Alan Levine, San Diego, CA (US)

(73) Assignee: TrustFour Technologies, Inc., San Diego, CA (US)

( * ) Notice: Subject to any disclaimer, the term of this patent is extended or adjusted under 35 U.S.C. 154(b) by 271 days.

This patent is subject to a terminal disclaimer.

(21) Appl. No.: 17/492,019

(22) Filed: Oct. 1, 2021

(65) Prior Publication Data

US 2023/0107962 A1   Apr. 6, 2023

(51) Int. Cl.
*H04L 9/40* (2022.01)

(52) U.S. Cl.
CPC ...... *H04L 63/0435* (2013.01); *H04L 63/0823* (2013.01); *H04L 63/166* (2013.01); *H04L 63/20* (2013.01)

(58) Field of Classification Search
CPC ............. H04L 63/0435; H04L 63/0823; H04L 63/166; H04L 63/20
See application file for complete search history.

(56) References Cited

U.S. PATENT DOCUMENTS

| | | | |
|---|---|---|---|
| 8,306,229 B2 | 11/2012 | Pang et al. | |
| 8,700,729 B2* | 4/2014 | Dua | G06Q 20/3674 705/64 |
| 9,838,361 B2 | 12/2017 | Birger | |
| 11,689,510 B2* | 6/2023 | Benson | H04L 9/3263 713/189 |
| 2016/0234683 A1 | 8/2016 | Vodafone | |
| 2017/0208062 A1* | 7/2017 | Morikawa | H04L 9/0877 |

(Continued)

OTHER PUBLICATIONS

Luo et al., "Optimizing Bloom Filter: Challenges, Solutions, and Comparisons," IEEE Communications Surveys & Tutorials • Apr. 2018, Institute of Electrical and Electronics Engineers, Piscataway, NJ., U.S.

(Continued)

*Primary Examiner* — Azizul Choudhury
(74) *Attorney, Agent, or Firm* — Fresh IP PLC; John R. Bednarz

(57) ABSTRACT

A method includes requesting, by a first computing device having a first application and a first transport layer security (TLS) library, a sequence of cryptographic keys from a first mutual key management service (MKMS), the sequence of cryptographic keys based on an MKMS key, requesting, by a second computing device having a second application and a second TLS library, the sequence of cryptographic keys from a second MKMS, performing, by the first MKMS having a first certificate and the second MKMS having a second certificate, an authorization, comparing, by one of the first MKMS and the second MKMS, a second MGroup identifier with a first MGroup rule, and the first MKMS and the second MKMS creating the sequence of cryptographic keys based on the MKMS key.

20 Claims, 10 Drawing Sheets

(56) References Cited

U.S. PATENT DOCUMENTS

2020/0076600 A1* 3/2020 Driever .............. H04L 63/0869
2021/0266152 A1* 8/2021 Sczepczenski ....... H04L 9/0894

OTHER PUBLICATIONS

Luo et al., "Optimizing Bloom Filter: Challenges, Solutions, and Comparisons," IEEE Communications Surveys & Tutorials • Apr. 2018, Institute of Electrical and Electronics Engineers, Piscataway, NJ., U.S., 37 pages.

Search Report for International Patent Application PCT/US22/44493, mailed on Jan. 24, 2023, 6 pages.

\* cited by examiner

MUTUAL KEY MANAGEMENT SERVICE SYSTEM AND METHOD

BACKGROUND

Cryptographic protocols such as Transport Layer Security (TLS), Internet Protocol Security (IPSec), and Secure Shell (SSH) permit applications operating on different computing devices located at a physical distance to communicate privately through encrypted, and if properly configured, mutually authenticated transmissions. Although there is a way for each party to authenticate its peer, key management and visibility provide significant hurdles. An enterprise having a plurality of applications may not have the computational or financial ability to implement, manage, and/or refactor its applications to obtain cryptographic improvements including authentication. These protocols often do not include authorization within their scope.

A broad spectrum of industries such as banking, defense, retail, manufacturing, distribution, and telecommunications rely upon the TLS protocol to encrypt data in transit. Aspects of the TLS protocol or the way applications used the protocol required changes to the applications. Although it is desirable to implement the improvements, it is simply not feasible due to financial and computational limitations and complications. The industries would prefer to leverage technology that may improve the TLS protocol or usage of the TLS protocol without modifying existing applications.

It is with these issues in mind, among others, that various aspects of the disclosure were conceived.

SUMMARY

According to one aspect, a mutual key management service system and method is provided for communicating data between a first application and a second application that is encrypted/decrypted using keys derived by a mutual key management service (MKMS) but only if authorized. In a first step, a command and control server computing device may sign a first certificate. The command and control server computing device may sign a second certificate. The command and control server computing device may provide the first certificate to a first MKMS. The command and control server computing device may provide the second certificate to a second MKMS. The command and control server computing device may sign the first certificate and the second certificate and provide the first certificate and the second certificate to the first MKMS and the second MKMS periodically such as once a day.

Next, the first MKMS and the second MKMS may attempt to create a mutually authenticated TLS session using the first certificate and the second certificate. This may include determining if the attempt to create the mutually authenticated TLS session is authorized and the first application may attempt to open a TLS connection with the second application. The first application may invoke the first TLS library. The first TLS library may request a sequence of cryptographic keys from the first MKMS. The first MKMS and the second MKMS may create a sequence of cryptographic keys for use. Alternatively, the authorization may be denied and as a result, the sequence of keys is not distributed.

Example applications may include mutual authentication, mutual authorization, multi-dimensional authorization, cryptographically protecting private key(s), change of encryption algorithm(s) or key lengths or elliptical curves used in Diffie-Hellman.

Pervasive mutual authentication provides controls that may limit lateral movement and cryptoagility may allow an enterprise to upgrade its cryptographic hygiene. The system provides mutual authentication and rotating cryptographic keys. In addition, the system allows for removing older or obsolete versions of encryption protocols. The system further provides a way to transition to quantum-safe computing that may leverage algorithms that are designed to be safe from quantum crypto-analysis. The system may be executed by computing devices with a variety of computational ability including mobile computing devices and computing devices associated with Internet of Things (IoT). Often mobile computing devices and IoT devices may not be capable of handling asymmetric cryptographic tasks and may benefit from mutual authentication with rotating cryptographic keys.

In one example, a method may include requesting, by a first computing device having a first application and a first transport layer security (TLS) library, a sequence of cryptographic keys from a first mutual key management service (MKMS), the sequence of cryptographic keys based on an MKMS key, requesting, by a second computing device having a second application and a second TLS library, the sequence of cryptographic keys from a second MKMS, the sequence of cryptographic keys based on the MKMS key, performing, by the first MKMS having a first certificate and the second MKMS having a second certificate, an authorization, the first certificate having a first MGroup rule and the second certificate having a second MGroup identifier, comparing, by one of the first MKMS and the second MKMS, the second MGroup identifier with the first MGroup rule, and determining that the authorization between the first MKMS and the second MKMS is approved, the first MKMS and the second MKMS creating the sequence of cryptographic keys based on the MKMS key, and communicating between the first application of the first computing device to the second application of the second computing device using the sequence of cryptographic keys based on the MKMS key.

In another example, a system may include a first computing device having a memory, at least one processor, a first application, and a first transport layer security (TLS) library, the first computing device to request a sequence of cryptographic keys from a first mutual key management service (MKMS), the sequence of cryptographic keys based on an MKMS key, a second computing device having a memory, at least one processor, a second application, and a second TLS library, the second computing device to request the sequence of cryptographic keys from a second MKMS, the sequence of cryptographic keys based on the MKMS key, the first MKMS having a first certificate having a first MGroup rule, the second MKMS having a second certificate having a second MGroup identifier, one of the first MKMS and the second MKMS to perform an authorization by comparing second MGroup identifier with the first MGroup rule, and the first MKMS and the second MKMS to determine that the authorization between the first MKMS and the second MKMS is approved and allow communication between the first application of the first computing device to the second application of the second computing device using the sequence of cryptographic keys based on the MKMS key, the first MKMS and the second MKMS creating the sequence of cryptographic keys based on the MKMS key.

In another example, a non-transitory computer-readable medium includes instructions stored thereon that, when executed by at least one processor, causes the at least one processor to perform operations including requesting, by a first computing device having a first application and a first transport layer security (TLS) library, a sequence of cryptographic keys from a first mutual key management service (MKMS), the sequence of cryptographic keys based on an MKMS key, requesting, by a second computing device having a second application and a second TLS library, the sequence of cryptographic keys from a second MKMS, the sequence of cryptographic keys based on the MKMS key, performing, by the first MKMS having a first certificate and the second MKMS having a second certificate, an authorization, the first certificate having a first MGroup rule and the second certificate having a second MGroup identifier, comparing, by one of the first MKMS and the second MKMS, the second MGroup identifier with the first MGroup rule, and determining that the authorization between the first MKMS and the second MKMS is approved, the first MKMS and the second MKMS creating the sequence of cryptographic keys based on the MKMS key, and communicating between the first application of the first computing device to the second application of the second computing device using the sequence of cryptographic keys based on the MKMS key.

In another example, a method includes requesting, by a first computing device having a first application and a first certificate a sequence of cryptographic keys from a first mutual key management service (MKMS), the sequence of cryptographic keys based on an MKMS key and stored in a first TLS library, requesting by a second computing device having a second application and a second certificate the sequence of cryptographic keys from a second MKMS, the sequence of cryptographic keys based on the MKMS key and stored in the second TLS library, requesting by a third computing device having a third application and a third certificate a different sequence of cryptographic keys from a third MKMS, the sequence of cryptographic keys based on the MKMS key and stored in the third TLS library, communicating a message from the first computing device to the second computing device based upon authentication and authorization information found in the first and second certificate, communicating the message from the second computing device to the third computing device based upon authentication and authorization information found in the second and third certificate, and communicating the message from the second computing device to the third computing device based upon authentication and authorization information found in the first and third certificate.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
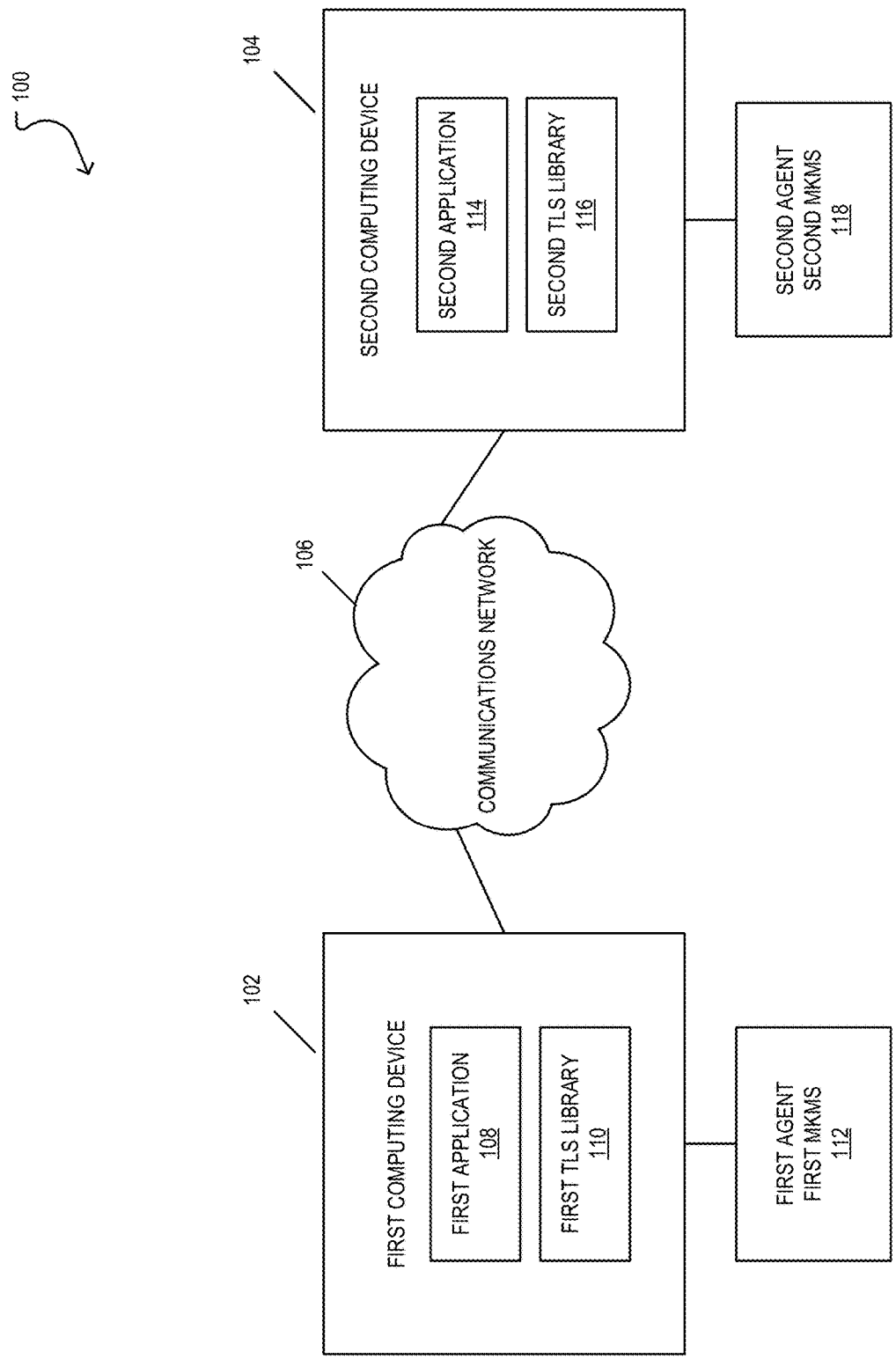
FIG. 1 is a block diagram of a mutual key management service (MKMS) system according to an example of the instant disclosure.

A mutual key management service system and method is provided for communicating data between a first application and a second application that is encrypted/decrypted using keys derived by a mutual key management service (MKMS) but only if authorized.

A command and control server computing device may sign a first certificate. The command and control server computing device may sign a second certificate. The command and control server computing device may provide the first certificate to a first MKMS and the command and control server computing device may provide the second certificate to a second MKMS. The command and control server computing device may sign the first certificate and the second certificate and provide an updated version of the first certificate and the second certificate to the first MKMS and the second MKMS periodically such as once a day or at another interval of time.

In some examples, the command and control computing device may sign an intermediary certificate which contains a public key. The command and control server or another server may use the private key to sign the first and second certificate. In some examples, multiple levels of intermediary certificates exist where each intermediary certificate has a corresponding private key that signs the next certificate. For example, the root private key signs intermediary certificate-A, the private key associated with intermediary certificate-A signs intermediary certificate-B, and the private key associated with intermediary certificate-B signs the first and second certificate.

Next, the first MKMS and the second MKMS may attempt to create a mutually authenticated TLS session using the first certificate and the second certificate. This may include determining if the attempt to create the mutually authenticated TLS session is authorized and the first application may attempt to open a TLS connection with the second application. The first application may invoke the first TLS library. The first TLS library may request a sequence of cryptographic keys from the first MKMS. The first MKMS and the second MKMS may create a sequence of cryptographic keys for use. Alternatively, the authorization may be denied.

As another example, a method may include requesting, by a first computing device having a first application and a first transport layer security (TLS) library, a sequence of cryptographic keys from a first mutual key management service (MKMS), the sequence of cryptographic keys based on an MKMS key and stored in the first TLS library, requesting, by a second computing device having a second application and a second TLS library, the sequence of cryptographic keys from a second MKMS, the sequence of cryptographic keys based on the MKMS key and stored in the second TLS library, performing, by the first MKMS having a first certificate and the second MKMS having a second certificate, an authorization, the first certificate having a first MGroup identifier and a first MGroup rule and the second certificate having a second MGroup identifier and a second MGroup rule, comparing, by the first MKMS, one of the first MGroup identifier with the second MGroup rule and the second MGroup identifier with the first MGroup rule, and determining that the authorization between the first MKMS and the second MKMS is approved, the first MKMS and the second MKMS creating the sequence of cryptographic keys based on the MKMS key, and communicating between the first application of the first computing device to the second application of the second computing device using the sequence of cryptographic keys based on the MKMS key.

The system provides multi-dimensional authorization and unifies authorization that was historically handled by different roles within an enterprise and with a complex collection of tools. The inherent complexity in traditional solutions led to anomalies that an adversary could exploit for nefarious purposes. The multi-dimensional authorization system and method may handle a variety of different types of authorization including:

Network segmentation (e.g., split the network into regions that do not directly communicate through limited controlled boundaries. Examples regions may be development, test, and production regions).

Application (e.g., Split the technology deployment into accordance with business functionality. Examples may include finance, human resource, or manufacturing).

Architecture (e.g., Split the technology into types. Examples are web server, application server, and database).

Privileged Access Management (e.g., Split the network into privileged and standard regions. All privileged access commands communicate over the privileged network and other messages communicate over the standard network).

The mutual key management service system and method may be associated with an existing application or new application. As a result, any of the features may be offered in isolation or in combination with others.

Applications communicate among themselves using Application Programming Interfaces (APIs). These APIs often require security. Security at the application layer either includes a token, e.g., OAuth, a digital signature over the message, or a long-lived password or key called an API key. The token may require changes to the application and is not secure if leaked. As a mitigating control, tokens have a relatively short time to live so that an adversary cannot use the token if the adversary discovers the token too late. The digital signature over the message requires extensive changes to the application, and the long-lived password is very susceptible to leakage.

A synchronous API communicates data directly between a producer and a consumer. An asynchronous API communicates messages from a producer to a queue. The consumer subsequently picks up the data from the queue. The time that a message may reside on the queue could extend past the recommended time to live of a token.

FIG. 1 illustrates a block diagram of a mutual key management service system 100 according to an example embodiment. The mutual key management service system 100 may include a plurality of computing devices such as a first computing device 102 and a second computing device 104 that communicate via a communication network 106. The first computing device 102 and/or the second computing device 104 may be one or more computing devices, a virtual machine, a container, or another type of packager that may be capable of executing one or more programs or applications. The first computing device 102 may execute a first application 108 using at least one processor and the second computing device 104 may execute a second application 114 using at least one processor. In addition, the first computing device 102 may have a first TLS library 110 and the second computing device 104 may have a second TLS library 116. The first computing device 102 may have access to a first agent 112 or a first mutual key management service (MKMS) and the second computing device 104 may have access to a second agent 118 or a second mutual key management service (MKMS).

The mutual key management service system 100 may provide a number of benefits including allowing enterprise computer networks to utilize and leverage encryption protocols such as TLS, Datagram Transport Layer Security (DTLS), IPSec, and SSH using their own computing environment or a number of computing environments across different computing networks. Additionally, the cryptographic platform system 100 provides cryptoagility and visibility to provide a quantum safe environment. The computing networks may utilize computing devices with minimal computing power such as Internet of Things (IoT) devices that may be capable of implementing symmetric cryptographic algorithms but are unable to implement asymmetric cryptographic algorithms. Even further, the cryptographic platform provides improvements in efficiency in cryptographic handshakes used in key management.

As shown in FIG. 1, the first application 108 may communicate with the second application 114 using a cryptographic protocol and send data that is encrypted/decrypted with cryptographic keys that may be obtained or derived from the first agent 112 or the first MKMS. In addition, the second application 114 may communicate with the first application 108 and send data that is encrypted/decrypted with cryptographic keys that may be obtained or derived from the second agent 118 or the second MKMS.

As an example, the cryptographic protocol may be SSL v2, SSL v3, TLS 1.0, TLS 1.1, TLS 1.2, and TLS 1.3, among others. In one example, the system 100 may have one or more libraries such as the first TLS library 110 and the second TLS library 116 that implement TLS. The first application 108 may interface or communicate with the first TLS library 110 using an Application Programming Interface (API) and the second application 114 may interface or communicate with the second TLS library 116 using an API. In one example, the API is identical or a superset of the aspects of the API used by TLS libraries that do not leverage the system 100 but offer TLS using a key management scheme such as a server which presents a certificate to a client and does not include agents that are separated from the respective libraries. Both the client and server trust their respective TLS libraries to implement the cryptographic communication protocol. However, the details associated with the TLS libraries are hidden from the application behind the API. Using a patch or an overwrite method, one may swap out the old TLS libraries and replace with new TLS libraries without changing the application where the new TLS libraries offer mutual authentication using the methods described herein.

For example, the first computing device 102 may utilize the system 100 and the first application 108 may communicate with a new, upgraded, and updated TLS library and the new TLS library may be installed as a replacement. As an example, the new TLS library may be the first TLS library 110. As long as the new TLS library uses the same API as the old TLS library, the first application 108 does not have to be modified.

As an example, the first application 108 may have access to the first TLS library 110 that obtains or derives the cryptographic keys from the first agent 112 or the first MKMS and the second application 114 may have access to the second TLS library 116 that obtains or derives the cryptographic keys from the second agent 118 or the second MKMS. For example, the first TLS library 110 may utilize a pre-shared key such as PSK-1 and the second TLS library 116 may utilize the same PSK-1. If the first TLS library gets an updated key and rotates to PSK-2, then the second TLS library also may get an updated key and rotate to PSK-2. In one example, the cryptographic keys after PSK-1 may be derived using Hashed Message Authentication Code (HMAC)-based key derivation function (HKDF) or using another method.

In a conventional solution, the first TLS library 110 would obtain its key from a key negotiation handshake that does not involve an external agent such as first agent 112 or the first MKMS. In one example, the first TLS library 110 may send a request to the first agent 112 or the first MKMS for a key and receive a key such as PSK-1. In another example, the first TLS library 110 may send a request to the first agent 112 or the first MKMS for a key and the first agent 112 or the first MKMS may asynchronously overwrite the encryption key used by the first TLS library 110 by sending the PSK-1. In another example, the first TLS library 110 may obtain a pre-key such as pre-PSK-1 from the first agent 112 or the first MKMS and derive PSK-1 from the pre-key. The first TLS library 110 may compute or determine a message digest, e.g., SHA-512, over the pre-key such as pre-PSK-1 and truncate to the first two-hundred and fifty-six bits or another length. This process may continue for PSK-2, PSK-3, . . . , PSK-n where PSK-(i+1) is SHA-512(PSK-i|pre-PSK-1) truncated to 256 bits. In other words, PSK-(i+1) is SHA-512 computed over the concatenation if PSK-I and pre-PSK-1, where the 512 bit message digest result is truncated to 256 bits.

Because the first TLS library 110 and the second TLS library 116 have identical copies of cryptographic keys supplied by agents or MKMSs, the communication has mutual authentication once the respective libraries mutually demonstrate possession of those keys. Thus, the system 100 provides mTLS or mutually authenticated TLS. In a further example, one or more of the first computing device 102 and the second computing device 104 may be a reverse proxy, e.g., a web server, or a forward proxy.

In one example, the first agent 112 or the first MKMS and the second agent 118 or the second MKMS may agree upon a sequence of cryptographic keys using authenticated key agreement. The key agreement may be associated with Diffie-Hellman, Quantum-Safe key agreement such as Supersingular Isogeny Key Encapsulation (SIKE), Supersingular Isogeny Diffie-Hellman Key Exchange (SIDH), or Post-Quantum Diffie-Hellman (PQDH), among others. Each of the first agent 112 or the first MKMS and the second agent or the second MKMS may have access to a secret key such as an MKMS key. The first agent 112 or the first MKMS and the second agent 118 or second MKMS may agree upon a sequence of keys such as PSK-1, PSK-2, . . . PSK-n while mutually authenticating each other using the MKMS key.

As an example, the first agent 112 or the first MKMS and the second agent 118 or second MKMS may utilize a mutually encrypted channel. The first agent 112 or the first MKMS may have a first certificate and an associated private key. The second agent 118 or the second MKMS may have a third certificate and an associated private key. The first agent 112 or the first MKMS and the second agent 118 or second MKMS may communicate using a TLS channel and each agent may validate the other agent's certificate including the expected Distinguished Name. The certificate validation can be in accordance with the TLS specification.

As another example, the first agent 112 or the first MKMS and the second agent 118 or the second MKMS may build a TLS connection by mutually authenticating one another and using a shared secret password. The shared secret password may be an MKMS key. Each of the first agent 112 or the first MKMS and the second agent 118 or the second MKMS may mutually authenticate to one another using the Socialist Millionaire Protocol (SMP), among other methodologies.

In a further example, the first agent 112 or the first MKMS and the second agent 118 or the second MKMS may communicate with a common root distributor and the common root distributor may provide the MKMS key to each agent.

In one example, the first agent 112 or the first MKMS and the first TLS library 110 may reside on the first computing device 102. In another example, the first agent 112 or the first MKMS and the first TLS library 110 may be on different computing devices. In another example, the first agent 112 or the first MKMS and the first TLS library 110 may communicate using a TLS encrypted channel, an SSH encrypted channel, an IPSec encrypted channel, a protected network or virtual local area network (VLAN) that may be protected by a firewall or a Network Secure Group. In another example, the first agent 112 or the first MKMS may communicate with a plurality of TLS libraries. The first TLS library 110 does not receive a PSK provided to any of the other plurality of TLS libraries with which the first agent 112 or the first MKMS communicates. In another example, the first TLS library 110 and a plurality of other TLS libraries with which the first agent 112 or the first MKMS communicates receive identical PSKs.

The first application 108 and the second application 114 may utilize an encryption/decryption algorithm such as Advanced Encryption Standard (AES) or Rijndael using a 256-bit key or Triple-Data Encryption Standard (TDES), among others. Each of the first TLS library 110 and the second TLS library 116 may be associated with or derived from OpenSSL.

Figure 2:
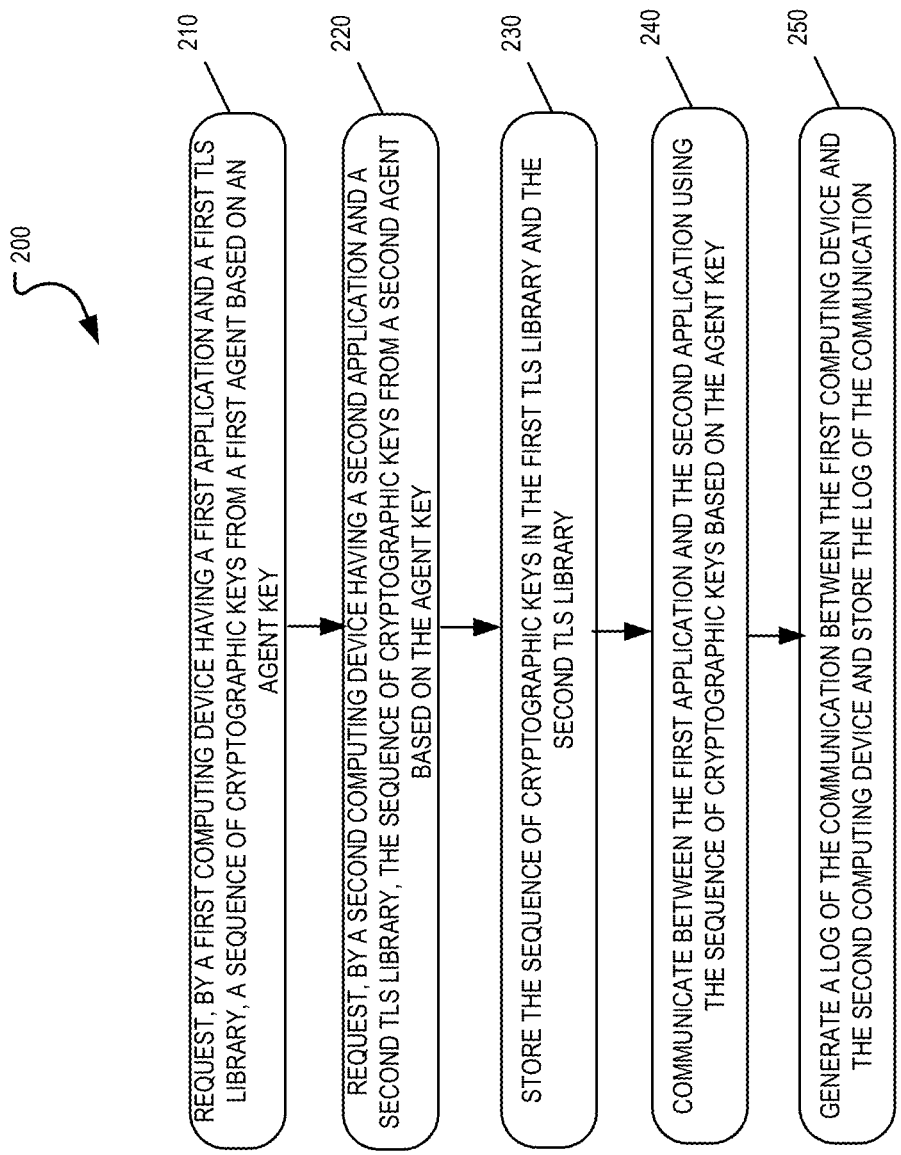
FIG. 2 is a flowchart of a method for communicating data between a first application and a second application that is encrypted/decrypted using keys derived by the mutual key management service (MKMS) system according to an example of the instant disclosure.

FIG. 2 illustrates an example method 200 for communicating data between the first application 108 and the second application 114 that is encrypted/decrypted using keys derived by an MKMS, each application having access to a TLS library. Although the example method 200 depicts a particular sequence of operations, the sequence may be altered without departing from the scope of the present disclosure. For example, some of the operations depicted may be performed in parallel or in a different sequence that does not materially affect the function of the method 200. In other examples, different components of an example device or system that implements the method 200 may perform functions at substantially the same time or in a specific sequence.

According to some examples, the method 200 includes requesting, by a first computing device 102 having a first application 108 and a first TLS library 110, a sequence of cryptographic keys from a first agent 112 or first MKMS, the sequence of cryptographic keys based on an agent key or MKMS key and stored in the first TLS library 110 at block 210. In one example, each cryptographic key in the sequence of cryptographic keys is two-hundred and fifty-six bits in length, among other lengths. The first application 108 may interface with the first TLS library 110 using an Application Programming Interface (API).

As an example, the first agent 112 or the first MKMS and the second agent 118 or the second MKMS may create a TLS connection using a shared secret password and generate a first cryptographic key in the sequence of cryptographic keys. As another example, the first agent 112 or the first MKMS may derive a first cryptographic key of the sequence of cryptographic keys by computing a message digest over the first cryptographic key and truncating to a first two-hundred and fifty-six bits or another length.

As noted above, at least one of the first computing device 102 and the second computing device 104 may be an Internet of things (IoT) device. In another example, the first computing device 102 is a client computing device and the second computing device 104 is a server computing device. In addition, in some examples, at least one of the first TLS library 110 and the second TLS library 116 may be associated with OpenSSL. Alternatively or in addition, the first TLS library 110 and the second TLS library 116 may implement IPSec.

According to some examples, the method 200 includes requesting, by a second computing device 104 having a second application 114 and a second TLS library 116, the sequence of cryptographic keys from a second agent 118 or a second MKMS, the sequence of cryptographic keys based on the MKMS key and stored in the second TLS library 116 at block 220. The first agent 112 or the first MKMS and the second agent 118 or second MKMS may operate a key agreement protocol to generate the sequence of cryptographic keys. In another example, the first agent 112 or the first MKMS has a first public key and a first private key that are mathematically related with the first public key residing in a first certificate. The first TLS library 110 has a second public key and a second private key that are mathematically related with the second public key residing in a second certificate. The second agent 118 or the second MKMS has a third public key and a third private key which are mathematically related with the third public key residing in a third certificate.

The first agent 112 or the first MKMS is given the second certificate and the first TLS library 110 is given the first certificate. The first agent 112 or the first MKMS is given the third certificate and the second agent 118 or the second MKMS is given the first certificate. The first TLS library 110 and the first agent 112 or the first MKMS communicate over mutually authenticated TLS using AES256 as the symmetric encryption algorithm. The first agent 112 or the first MKMS and the second agent 118 or the second MKMS communicate over mutually authenticated TLS using AES256 as the symmetric encryption algorithm.

According to some examples, the method 200 includes storing the sequence of cryptographic keys in the first TLS library 110 and the second TLS library 116 at block 230. In some examples, the first agent 112 or the first MKMS and the second agent 118 or the second MKMS mutually authenticate using a sequence of pre-shared keys based upon the Socialist Millionaire Protocol (SMP).

According to some examples, the method 200 includes communicating between the first application 108 of the first computing device 102 to the second application 114 of the second computing device 104 using the sequence of cryptographic keys based on the MKMS key at block 240. In addition, a first cryptographic key in the sequence of cryptographic keys may rotate to a second cryptographic key in the sequence of cryptographic keys after a particular period of time, e.g., one hour, one day, or another period of time. The method may include communicating data that is encrypted with one key of the sequence of cryptographic keys from the first application 108 to the second application 114 using a communication channel. In addition, the method may include decrypting the data using the one key of the sequence of cryptographic keys by the second application 114.

According to some examples, the method 200 includes generating a log of the communication between the first computing device 102 and the second computing device 104 and sending the log of the communication by the first TLS library 110 and/or the second TLS library 116 to the first agent 112 or the first MKMS through a mutually authenticated TLS channel and/or sending a log of the communication by the second TLS library 116 to the second agent 118 or the second MKMS through a mutually authenticated TLS channel at block 250.

According to some examples, the method 200 includes decrypting the data using the one key of the sequence of cryptographic keys by the second application 114. In addition, a first cryptographic key in the sequence of cryptographic keys may rotate to a second cryptographic key in the sequence of cryptographic keys after a first hour and the second cryptographic key in the sequence of cryptographic keys may rotate to a third cryptographic key in the sequence of cryptographic keys after a second hour. This may continue until reaching an nth key in the sequence of cryptographic keys.

According to some examples, the method 200 includes displaying a graphical user interface that shows the log of the communication between the first computing device 102 and the second computing device 104. The log may be stored in the first agent 112 or the first MKMS or in another location.

Figure 3:
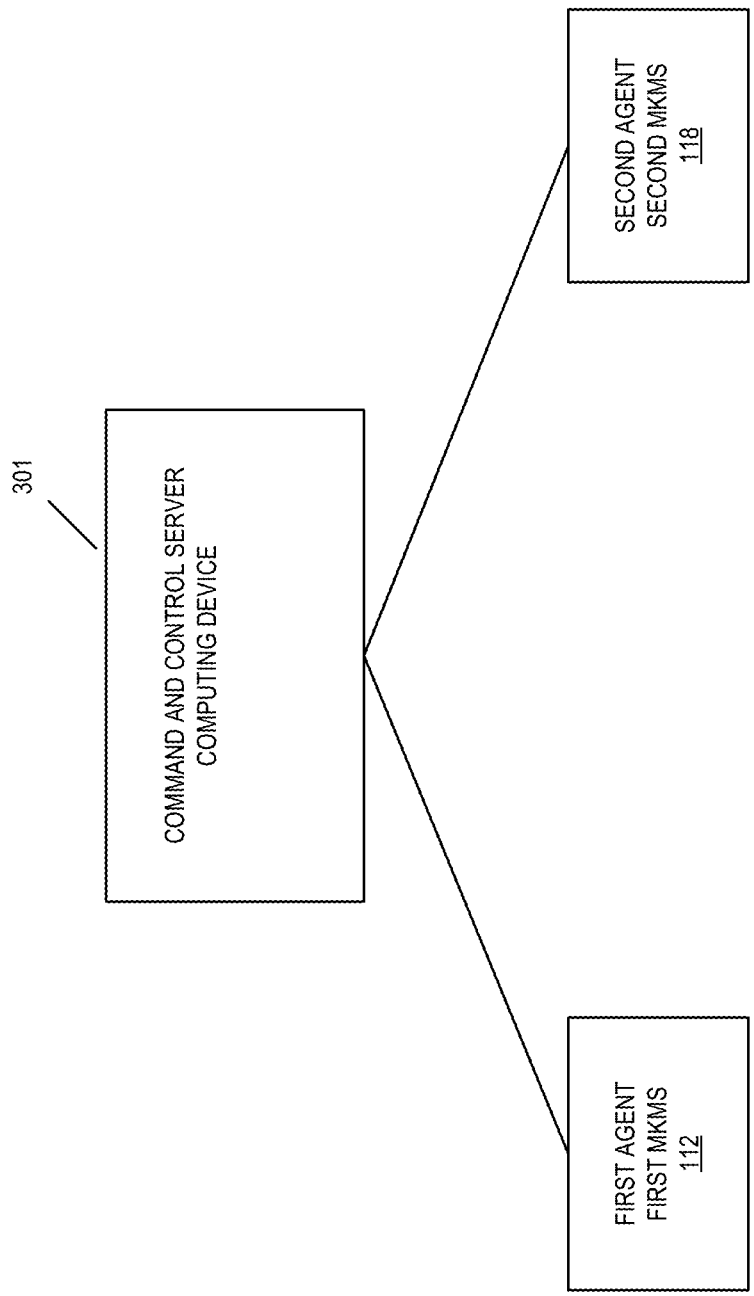
FIG. 3 is a block diagram of a system for provisioning according to an example of the instant disclosure.

FIG. 3 illustrates a block diagram of a system for provisioning according to an example of the instant disclosure. As shown in FIG. 3, a command and control server computing device 301 may securely communicate with the first MKMS 112 and the second MKMS 118. The command and control server computing device 301 may send command and control information that may authorize communication and/or establish security parameters with the first MKMS 112 and the second MKMS 118, among others.

As an example, if the command and control server computing device 301 authorizes communication between the first MKMS 112 and the second MKMS 118, then each respective MKMS may communicate a sequence of cryptographic keys as in block 210 and block 220.

However, if the command and control server computing device 301 does not authorize communication between the first MKMS 112 and the second MKMS 118, then the MKMS may not communicate and may not create the sequence of cryptographic keys as shown in block 210 and block 220. If the first MKMS 112 and the second MKMS 118 do not return the sequence of cryptographic keys, then the first application 108 and the second application 114 may not establish a TLS session.

As discussed herein, the command and control server computing device 301 may act as a certificate authority that may sign certificates for the first MKMS 112 and the second MKMS 118, among other MKMSs.

Figure 4:
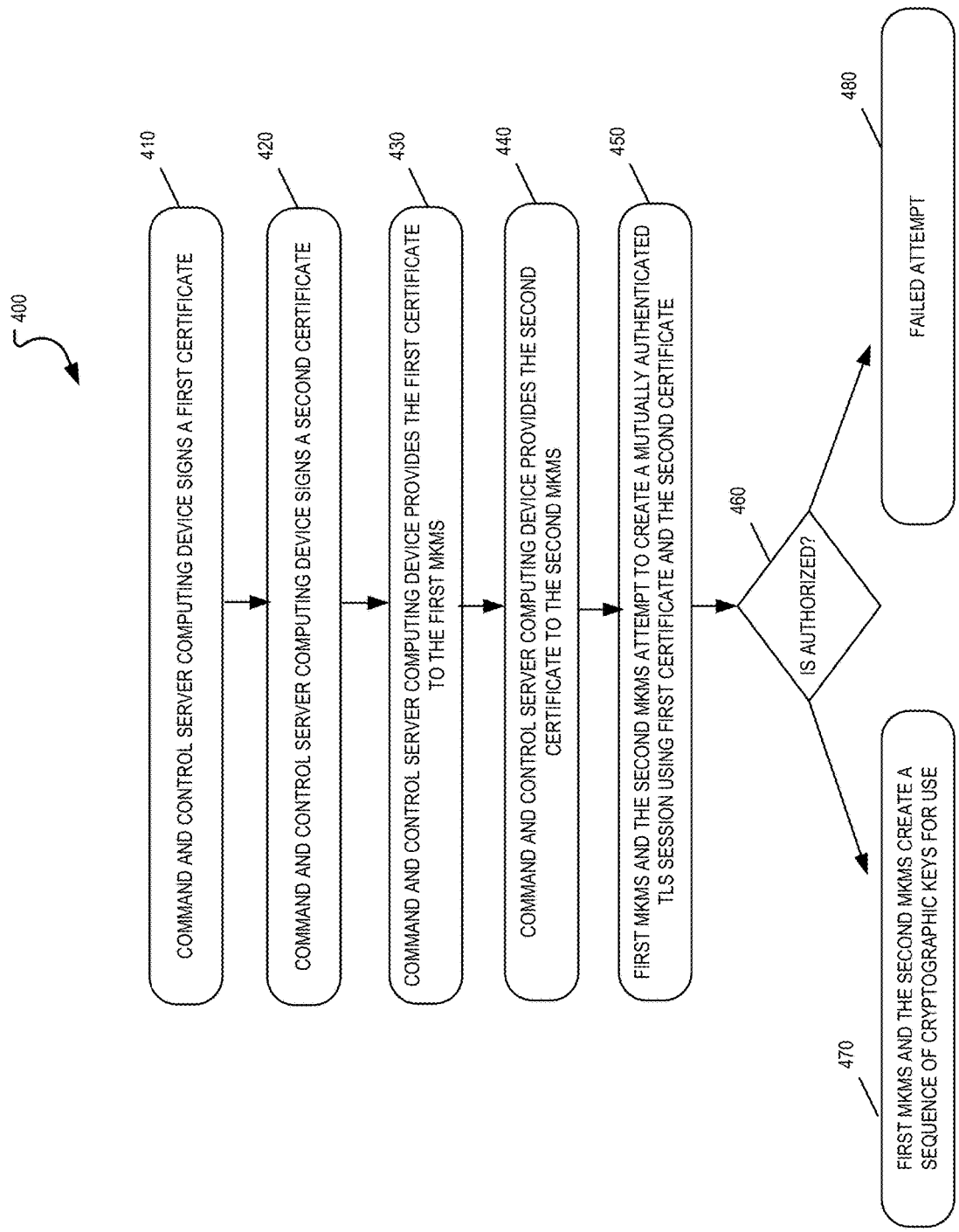
FIG. 4 is a flowchart of a method for communicating data between a first application and a second application that is encrypted/decrypted using keys derived by the MKMS but only if authorized according to an example of the instant disclosure.

FIG. 4 is a flowchart of a method 400 for communicating data between the first application 108 and the second application 114 that is encrypted/decrypted using keys derived by the MKMS but only if authorized according to an example of the instant disclosure. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some examples, the method 400 includes the command and control server computing device 301 signing a first certificate 312 at block 410. According to some examples, the method 400 includes the command and control server computing device 301 signing a second certificate 318 at block 420. According to some examples, the method 400 includes the command and control server computing device 301 providing the first certificate 312 to the first MKMS 112 at block 430.

According to some examples, the method 400 includes the command and control server computing device 301 providing the second certificate 318 to the second MKMS 118 at block 440. In one example, block 410 and block 430 may occur when MKMS 112 starts up and block 420 and 440 may occur when MKMS 118 starts up. As an example, the command and control server computing device 301 may perform block 410, 420, 430, and 440 periodically such as once a day or regularly at another period of time such as every twelve hours or every two days.

Next, according to some examples, the method 400 includes the first MKMS 112 and the second MKMS 118 attempting to create a mutually authenticated TLS session using the first certificate 312 and the second certificate 318 at block 450. According to some examples, the method 400 includes determining if the attempt to create the mutually authenticated TLS session is authorized at block 460. In other words, the first application 108 attempts to open a TLS connection with the second application 114. The first application may invoke the first TLS library 110. The first TLS library 110 may request a sequence of cryptographic keys from the first MKMS 112 that executes at block 450.

According to some examples, the method 400 includes the first MKMS 112 and the second MKMS 118 creating a sequence of cryptographic keys for use at block 470. As noted herein, the sequence of keys may be used as shown at block 210 and block 220. Alternatively, according to some examples, the method 400 includes the attempt failing at block 480. Discussion of determining if the attempt to create the mutually authenticated TLS session is authorized is further discussed below.

Certificate-Based Mutual Permission

The TLS protocol may include starting with a handshake. The steps in the TLS handshake may allow a client computing device and a server computing device to exchange certificates. One common practice includes using exchanged certificates such as first certificate 312 and second certificate 318 to mutually authenticate. The system 100 may include information in certificates to address additional objectives. In one example, the TLS version may be TLS 1.0, TLS 1.1, TLS 1.2, TLS 1.3, or a future version of TLS.

Figure 5:
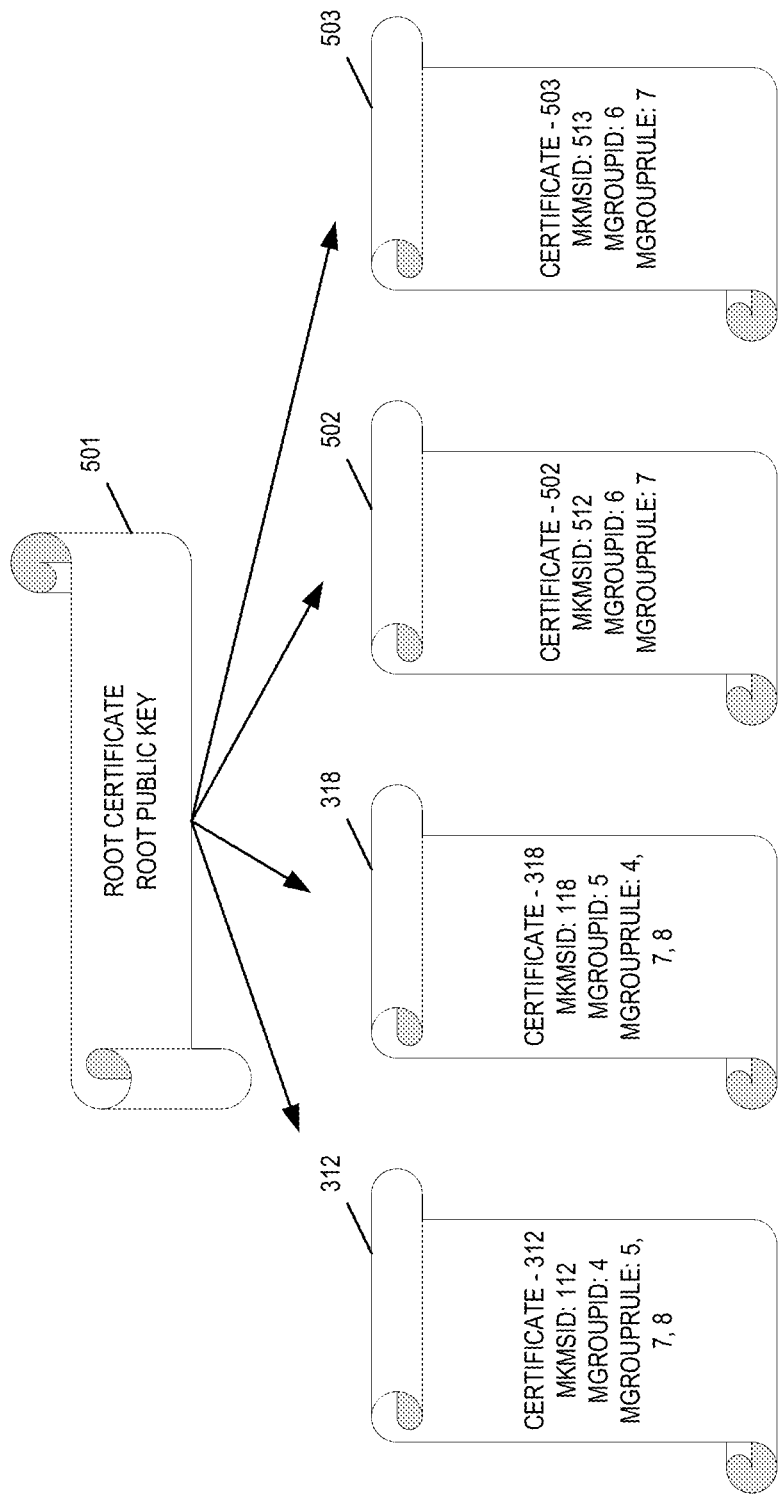
FIG. 5 is a diagram showing certificates used for authorization and authentication according to an example of the instant disclosure.

FIG. 5 is a diagram showing certificates used for authorization and authentication according to an example of the instant disclosure. FIG. 5 illustrates a root certificate 501 and the command and control server computing device 301 may hold an associated private key. The root certificate 501, the first certificate 312, the second certificate 318, certificate 502, and certificate 503 may be signed by the command and control server computing device private key. In one example, each of the certificates may comply with the X.509 version three specification. FIG. 5 shows extension fields and does not show other fields associated with the certificates. The X.509 standard may define a way for customizing extensions such that the extension fields are included within a scope of a certificate's signature. As a result, each MKMS may recognize the customized extensions.

Each MKMS may have a private key that may be associated with the respective certificate. As an example, certificate 312 may be the certificate provided to the first MKMS 112. In other words, the first MKMS 112 may have the private key and the corresponding public key may be in certificate 312. Similarly, certificate 318 may have a public key and the corresponding private key may be held by MKMS 118. Each MKMS may have exactly one certificate.

In addition, each certificate may have a name of the associated MKMS in a field called MKMSID. For example, certificate 312 may have the name of the associated MKMS which is MKMSID-112. Similarly, certificate 318 may have the name of its associated MKMS 118 and it may be MKMKSID-118. Certificate 502 may have the name of its associated MKMS and it may be MKMSID-512. Certificate 503 may have the name of its associated MKMS and it may be MKMSID-513.

In one example, each MKMS may be in exactly one MGroup. An MGroup is a collection of zero or more MKMSs. An MGroup is denoted by zero or more MKMSIDs. As an example, FIG. 5 illustrates three MGroups. MKMS 112 may be in an MGroup named MGroupID:4. MKMS 118 may be in an MGroup named MGroupID:5. An MKMS that is identified with MKMSID-512 and an MKMS that is identified with MKMSID-513 may be in an MGroupID:6.

According to an example, there may be two different types of MGroupRules including explicit and assumed. An explicit MGroupRule may allow communication between any two MKMSs in referenced MGroups. For example, certificate 312 may have three MGroupRules that allow communication with any MKMS in MGroupID:5, MGroupID:7, or MGroupID:8.

As an example, at block 210, MKMS may attempt to open a TLS connection with MKMS 118. MKMS 112 and MKMS 118 may exchange certificates based on the TLS protocol handshake. Further, according to the TLS protocol handshake, MKMS 112 may prove to MKMS 118 that MKMS 112 has the private key associated with certificate 312. This proof uses a digital signature executed by MKMS 112 and validated by MKMS 118. Additionally, within the context of the TLS protocol, MKMS 118 may prove to MKMS 112 that MKMS 118 has the private key associated with certificate 318. This proof uses a digital signature executed by MKMS 118 and validated by MKMS 112. In accordance with the TLS specification, the proof may involve a digital signature that may be created using the private key and verification may use the public key held in the certificate. Validation also may ensure that the certificate was signed by a private key associated with the root certificate. The root certificate can be distributed within the source code of each MKMS.

After validating the digital signature within the context of the TLS handshake, each MKMS may perform an authorization check. MKMS 112 may use certificate 318 that MKMS 112 received from MKMS 118. MKMS 112 may view the MGroupRule in MKMS 118 and MGroupID:4, MGroupID:7, and MGroupID:8 are present and associated with the rule in this case. MKMS 112 may compare against the MGroupID in its certificate 312 and determine that MGroupID:4 is in certificate 312 and MGroupID:4 is one of the permitted MGroupRules of certificate 318. As a result, MKMS 112 may authorize because certificate 312 indicates that MKMS 112 is a member of MGroupID:4 and certificate 318 indicates that MKMS 118 is a member of MGroup 5 and an MGroup Rule connects MGroupID:4 to MGroupID:5. Similarly, MKMS 118 may view MGroup 5 within the MGroupRules of certificate 312. Since MGroupID:5 is the MGroup identified in certificate 318, MKMS 118 may authorize.

However, in another example, MKMS 112 may attempt a connection with MKMS having MKMSID-512. MKMS 112 may review its certificate 312 and determine that it is associated with MGroupID:4. However, MGroupID:4 is not found in the certificate 502 MGroupRules. Thus, such a communication is not authorized because certificate 502 only has MGroupID:7. Additionally, the MKMS having MKMKSID-512 also may fail to authorize because MGroupID:6 is not within the MGroupRules of certificate 312. Certificate 312 only has MGroupRule: 5, 7, 8. If either peer does not authorize, then the communication between the respective MKMS does not occur.

Additionally, there are implicit type MGroupRules. If two MKMSs are in a same MGroup, then authorization may be permitted. As an example, the MKMS having the MKMSID-512 may communicate with the MKMS having MKMSID-513 because both MKMKSs have a same group—MGroupID: 6.

According to an example, TLS creates a secure channel for sending information and an adversary may not be able to easily view or intercept the transmitted information in the channel. Each channel may have two endpoints and each application 108 and 114 may create an endpoint. The endpoint may be controlled by an MKMS such as the first MKMS 112 or the second MKMS 118. A group of MKMSs is known as an MGroup. An MGroupRule may indicate the MGroups that may connect.

If the first application 108 is to connect with the second application 114, the first application 108 may create a TLS channel with the second application 114 as the destination.

In order for TLS to work between the first application and the second application, software libraries that implement the first application and the second application may request a respective MKMS to obtain one or more keys. When this occurs, the first MKMS and the second MKMS may communicate with one another if they have not done so previously. Each MKMS may indicate to the other MKMS MGroup information, e.g., the MGroup to which the MKMS belongs. If an MGroupRule connects the two MGroups or the two respective MKMSs are in the same MGroup, then the first MKMS and the second MKMS may be allowed to communicate and they may securely agree upon keys.

In short, an MGroup is a group of MKMSs and an MGroupRule identifies MGroups that may communicate with one another.

In some examples only one or both of the MKMSs performs the authorization check. The first application 108 attempts to connect with second application 114. In order to authorize, the first MKMS 112 performs an authorization check. In the TLS handshake with the second MKMS 118, the first MKMS 112 obtains the second certificate 318 of the second MKMS 118. The first MKMS 112 checks the second certificate 318 and determines that the second MKMS 118 is in MGroupID 5. The first MKMS 112 checks in its own first certificate 312 to see the MGroup rules. The first MKMS 112 determines that its MGroup rule is 5, 7, and 8. Since MGroupID 5 is in the MGroup rule in first certificate 312, the MKMS 112 authorizes the connection.

In some examples, only one or both of the MKMS uses the following comparison to perform the authorization check. The first application 108 attempts to connect with second application 114. In order to authorize, the first MKMS 112 performs an authorization check. In the TLS handshake with the second MKMS 118, the first MKMS 112 obtains the certificate 318 of the second MKMS 118. The first MKMS 112 checks in the first certificate 312 to determine that the first MKMS 112 is in MGroupID 4. The first MKMS 112 checks in its second certificate 318 to see the MGroup rules. The first MKMS 112 determines that the MGroup rule in second certificate 318 is 4, 7, and 8. Since MGroupID 4 is in the MGroup rule in the second certificate 318, the MKMS 112 authorizes the connection.

Multi-Dimensional MGroups

As an example, an MGroup may be assigned to a dimension. Each MGroup is to be assigned to exactly one dimension. An MGroupRule may connect MGroups in a same dimension. MGroupRules may be prohibited from connecting MGroups in different dimensions. An MKMS is to be assigned an MGroup from each dimension. Two MKMSs may communicate when an assumed (implicit) or explicit rule in all dimensions are satisfied.

Figure 6:
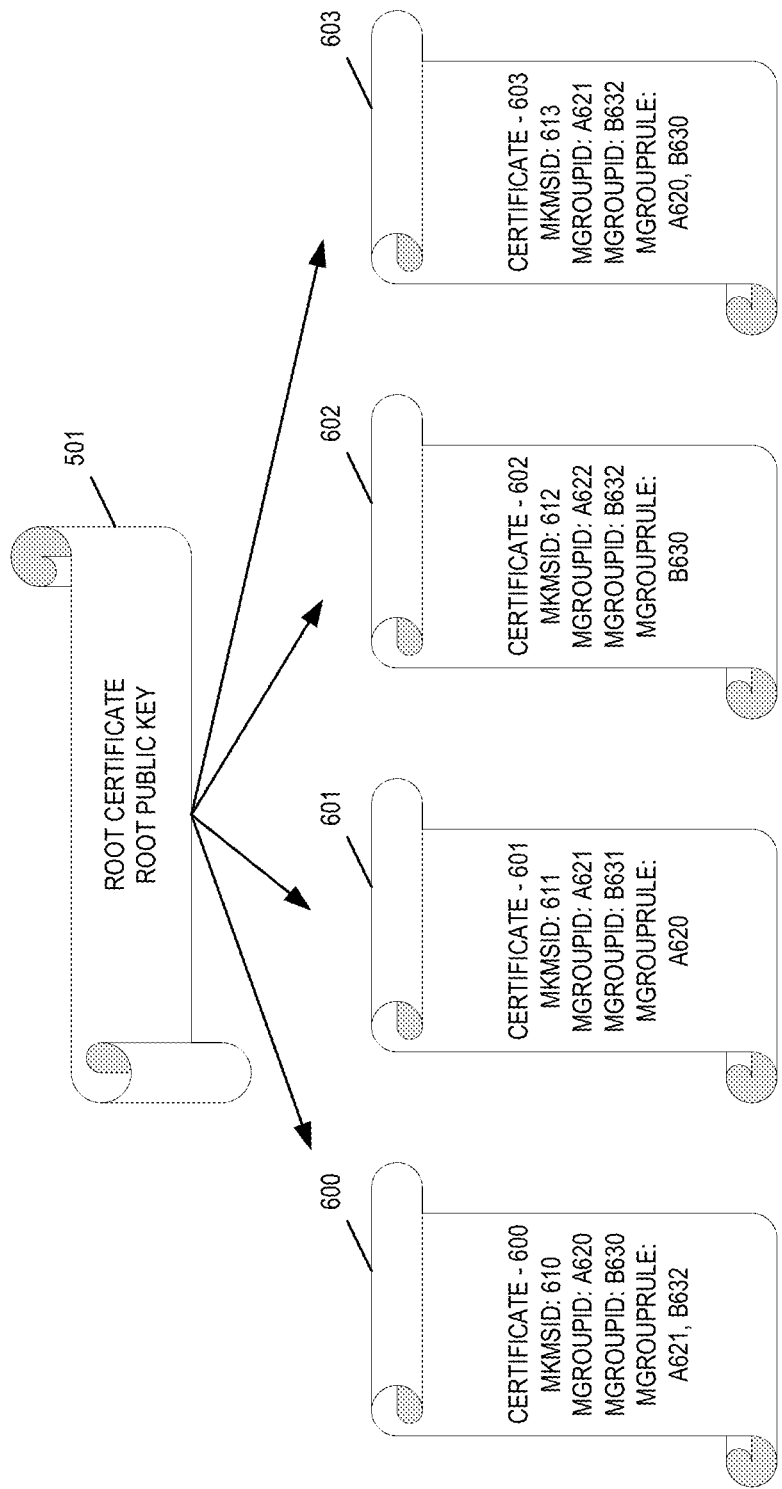
FIG. 6 is a diagram of certificates used for authorization and authentication that leverage multiple dimensions according to an example of the instant disclosure.

FIG. 6 is a diagram of certificates used for authorization and authentication that leverage multiple dimensions according to an example of the instant disclosure. Table One below shows permissible connections between MKMSs and their associated MKMSIDs.

TABLE ONE

|  | MKMSID-610 | MKMSID-611 | MKMSID-612 | MKMSID-613 |
|---|---|---|---|---|
| MKMSID-610 | Y | N | N | Y |
| MKMSID-611 | N | Y | N | N |
| MKMSID-612 | N | N | Y | N |
| MKMSID-613 | Y | N | N | Y |

As an example, the MKMS having MKMSID-610 may attempt to communicate with the MKMS having MKMSID-613. As shown in Table One and FIG. 6, the MKMSID-610 is in MGroup A620 and B630. MKMSID-613 is in MGroup-A621 and B-632. An MGroupRule is shown in FIG. 6 where A620 and A621 are connected. An MGroupRule is shown in FIG. 6 that connects B630 and B632. Since the connection is permitted in all dimensions, MKMS having MKMSID-610 and MKMS having MKMS-613 may be authorized to communicate.

In another example, the MKMS having MKMSID-610 may attempt to communicate with the MKMS having MKMSID-612. MKMSID-612 is in MGroup A622 and B632. Although the B dimension MGroup rule is present authorizing the connection, the A dimension MGroup rule is not present connecting A620 and A622. As a result, the connection between MKMSID-610 and MKMSID-612 is denied. When the connection is denied, the respective MKMSs do not agree upon a sequence of keys based upon an MKMS key.

The dimensions may represent a variety of different concepts. As an example, a first dimension may represent deployment. The first dimension may have MGroups that represent a Development, Test, and Production region. A second dimension may represent applications. The second dimension may have MGroups that represent Finance, Sales, Manufacturing, and Human Resource applications. A third dimension may represent architectural constraints. The third dimension may have MGroups that represent Web Servers, Application Servers, and Databases. A fourth dimension may represent a privileged and unprivileged network used for privileged access management. The fourth dimension may have MGroups representing Privileged and Unprivileged.

As another example, two different MKMSs may connect if any dimensions permit connection. As an example, if a first dimension has an MGroupRule permitting the connection and a second dimension does not have an MGroupRule permitting the connection, the two MKMSs may be allowed to connect.

As another example, a custom Boolean rule may be configured to cover multiple dimensions. There may be four dimensions including A, B, C, and D. A custom rule may be (A&B) or (C&D). In other words, the custom rule indicates that a connection between MKMSs may be established if an MGroupRule permits a connection in both dimensions A and B or both dimensions C and D; however, MGroupRules connecting A to C would not be sufficient and MGroupRules connecting B to D would not be sufficient. A custom Boolean rule may utilize operations including AND, OR, EXCLUSIVE-OR, NOT, and may use parenthesis.

In short, each MKMS may be a member of an MGroup in each dimension. In addition, there are no MGroupRules that may link an MGroup in one dimension with an MGroup in a different dimension. Thus, two MKMSs may only connect using an MGroupRule in each dimension that may allow the connection.

Algorithm Parameter Negotiation

As an example, the first application 108 and the second application 114 may utilize different cryptographic algorithm parameters. X25519, e.g., RFC 7748, and X448, e.g., RFC 7748, are the names of two different elliptical curves used in Elliptical Curve Diffie-Hellman key agreement. If the first application 108 and the second application 114 are unable to agree upon a same elliptical curve, the applications may be unable to agree upon keys to be used to communicate.

Certificate 312 may be extended to have an ordered list of permissible algorithm parameter values. As an example, certificate 312 may have the value ECDH:X25519, X448. In other words, the first application 108 may prefer use of X25519, but if a peer application does not allow X25519, then the first application 108 may use X448. A list of acceptable curves may be greater than two. The curves may be listed in an order of preference for the server.

In one example, MKMS 118 may open a TLS connection with MKMS 112. In this case, the MKMS 118 may a client and the MKMS 112 may be a server. The certificate of MKMS 112 may be certificate 312 and the certificate of MKMS 118 may be certificate 318. In addition to the information shown in FIG. 5, certificate 312 may have the ordered list with the value ECDH:X25519, X448. Certificate 318 may have X25519 listed as a value in its ordered list of EDCH options. If X25519 is found on certificate 318, it may be used. As another example, if X448 is an option, it may be used as a next option. If these options are not found on the certificate 318, the connection may not be allowed between the MKMS 118 and the MKMS 112 because an ECDH value cannot be negotiated. A certificate may list algorithms that are quantum safe. Example Quantum-Safe key agreement algorithms may be Supersingular Isogeny Key Encapsulation (SIKE), Supersingular Isogeny Diffie-Hellman Key Exchange (SIDH), or Post-Quantum Diffie-Hellman (PQDH), among others. Examples of quantum safe digital signatures are XMSS and LMS.

Private Key Protection

TLS security may be dependent on secrecy of the associated private key. If the private key is disclosed to an adversary, the adversary could potentially masquerade as a legitimate process in TLS mutual authentication. The MKMS 112 may be associated with a different operating system process from the first application 108 and thus the MKMS 112 may implement a method of protecting the private key without change to the first application 108.

As an example, MKMS 112 may have cryptographic key hk included in its source code. MKMS 112 may create a random key k and encrypt k with hk (e.g., {k}hk). MKMS 112 then may encrypt the private key with k (e.g., {private key}k). The MKMS 112 may store in the local file system {private key}k, {k}hk. In other words, the private key may be encrypted with k and k may be encrypted with hk. When the MKMS is started, the MKMS may retrieve contents of an associated file and use the hardcoded value hk to decrypt {k}hk to reveal k. Next, the MKMS may use k to decrypt and reveal the private key. The MKMS may use the plaintext private key as needed in an associated TLS handshake. The hardcoded key hk may be implemented using white box cryptography or using another method.

Certificate Revocation and Parameter Updates

In accordance with the TLS specification, MKMS 112 is not to accept the certificate 318 associated with MKMS 118 if it is expired or revoked. In addition, MKMS 118 is not to accept the certificate 312 associated with MKMS 112 if it is expired or revoked. As an example, certificates issued by the command and control server computing device 301 may expire periodically. A period may be one day and the command and control computing device 103 may issue replacement certificates every twelve hours. However, the certificates may expire at another period of time. When an associated MKMS receives a replacement certificate, the MKMS may discard an old certificate.

A replacement certificate may have a same public key as the certificate it may be replacing. In such an example, the MKMS may not have to change the corresponding private key. However, in one example, the replacement certificate may have a same public key but different MGroup membership or a different MGroupRule. As an example, the original certificate 312 may have MKMSID-112, MGroupID:4, and MGroupRule: 5, 7, 8. The replacement certificate for certificate 312 may have MKMSID-112, MGroupID: 4, and MGroupRule: 5, 7, 8, 9. In other words, the replacement certificate may allow the MKMS 112 to communicate with MKMSs in MGroupID: 9 but before receiving the replacement, MKMS 112 could not communicate with MKMSs in MGroupID:9. In another example, a second replacement certificate for certificate 312 may have MKMSID-112, MGroupID:5, MGroupRule: 4, 7, 8. In other words, the second replacement certificate moved the MKMS 112 from MGroupID:4 to MGroupID:5.

In one example, the command and control server computing device 301 may manage a certificate revocation list. The list may include one or more serial numbers of each revoked certificate that has not yet expired. As an example, the command and control server computing device 301 may expire and reissue certificates at 1:00 AM each day. On day one, no certificates may be revoked. At 2:00 AM on day two, a first certificate may have to be revoked and at 3:00 AM on day two, a second certificate may have to be revoked. The command and control server computing device 301 may send a revocation list to each MKMS having the serial numbers of the first certificate and the second certificate. At 1:00 AM on day three, the certificates issued on day two may expire. Thus, at this time, the command and control server computing device 301 may remove the first certificate and the second certificate from the revocation list.

The revocation list may be implemented as a Bloom filter and/or a list. The Bloom filter may return a result of "No" or "Maybe" when it is queried. The certificate revocation list may include a serial number of the first certificate and the second certificate. MKMS 112 and MKMS 118 may attempt to communicate. According to the TLS handshake, the MKMS 112 and the MKMS 118 may trade certificates 312 and 318. Each may determine whether a serial number of the certificate is in the revocation list (e.g., the Bloom filter). The Bloom filter may return a value of "No." In such an instance, the TLS handshake may occur because neither certificate has been revoked. However, in some instances, the Bloom filter may indicate "Maybe." In such a case, the Bloom filter results may be indeterminate. In this case, the MKMS may check each serial number on the revocation list to determine if either the serial numbers of certificate 312 or 318 have been revoked.

Additionally, when a certificate is replaced with new values, the old certificate is to be revoked. For example, when certificate 312 is replaced with certificate 312a, certificate 312 is to be revoked. When certificate 312a is replaced with certificate 312b, certificate 312a is to be revoked.

Local Authentication

The first TLS library and the first MKMS 112 may communicate through a secured channel. In one example, the first TLS library 110 and the first MKMS 112 may reside on a same physical computing device or virtual machine and may communicate through a named pipe. Authorization rules in the local file system may prohibit unauthorized connections to the named pipe.

In an example, the first TLS library 110 and the first MKMS 112 may communicate through an unroutable IP address and reside on the same physical computing device or virtual machine. Because the IP address is unroutable, an adversary that does not have access to the machine is not able to communicate with the first TLS library 110 and/or the first MKMS 112. In another example, the MKMS 112 may use its private key to digitally sign information that may be provided to the TLS library 110. The TLS library 110 may use the certificate 312 associated with MKMS 112 to verify the signature.

As another example, the first MKMS 112 and the first TLS library 110 may have a hardcoded symmetric key, lhk. Information sent from the first TLS library 110 to the first MKMS 112 may be encrypted with lhk. As another example, information sent from the first TLS library 110 to the first MKMS 112 may be encrypted with a randomly or pseudo-randomly generated key, lrk, which may be encrypted with lhk:{message}lrk, {lrk}lhk. As another example, lhk may be implemented with white box cryptography. Lhk may be provisioned to the first TLS library 110 and the first MKMS 112 for use and the local authentication.

Figure 7:
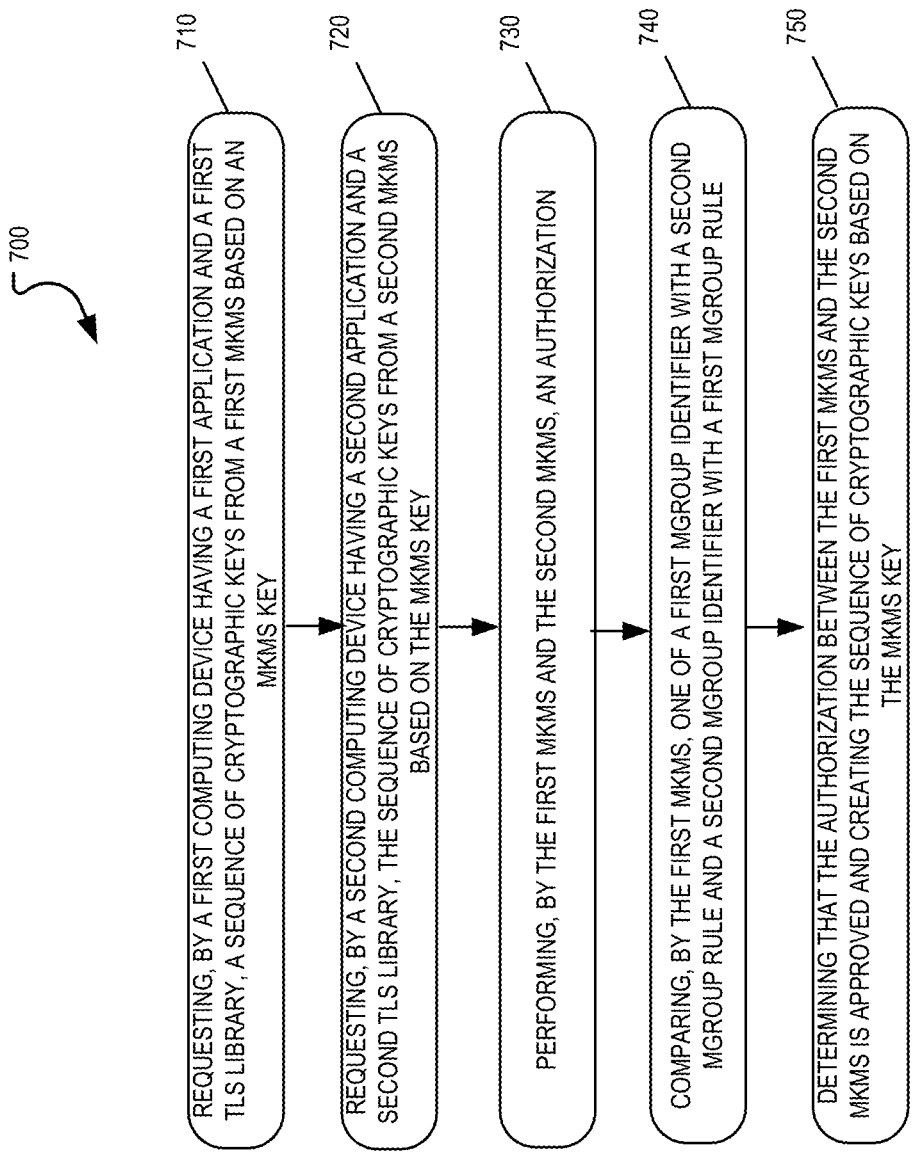
FIG. 7 is a flowchart of a method for determining an authorization between a first MKMS and a second MKMS according to an example of the instant disclosure.

FIG. 7 is a flowchart of a method 700 for determining an authorization between the first MKMS 112 and the second MKMS 118 according to an example of the instant disclosure. Although the example method 700 depicts a particular sequence of operations, the sequence may be altered without departing from the scope of the present disclosure. For example, some of the operations depicted may be performed in parallel or in a different sequence that does not materially affect the function of the method 700. In other examples, different components of an example device or system that implements the method 700 may perform functions at substantially the same time or in a specific sequence.

According to some examples, the method 700 includes requesting, by the first computing device 102 having the first application 108 and the first TLS library 110, a sequence of cryptographic keys from the first MKMS 112, the sequence of cryptographic keys based on the MKMS key and stored in the first TLS library at block 710.

According to some examples, the method 700 includes requesting, by the second computing device 104 having the second application 114 and the second TLS library 116, the sequence of cryptographic keys from the second MKMS 118, the sequence of cryptographic keys based on the MKMS key and stored in the second TLS library at block 720.

According to some examples, the method 700 includes performing, by the first MKMS 112 having a first certificate 312 and the second MKMS 118 having a second certificate 318, an authorization at block 730. The first certificate 312 may have a first group identifier and a first group rule and the second certificate 318 may have a second group identifier and a second group rule. In one example, the first group rule and the second group rule may each comprise a list of at least one allowable identifier. The first group identifier may be a first MGroup identifier and the second group identifier may be a second MGroup identifier. In addition, the first group rule may be a first MGroup rule and the second group rule may be a second MGroup rule.

In another example, the first MGroup rule and the second MGroup rule each have a type including one of assumed and explicit.

In another example, the first MGroup identifier includes a MGroup identifier from at least one dimension. In another example, the second MGroup identifier includes a group identifier from at least one dimension.

According to some examples, the method 700 includes comparing, by the first MKMS 112, one of the first MGroup identifier with the second MGroup rule and the second MGroup identifier with the first MGroup rule at block 740.

According to some examples, the method 700 includes determining that the authorization between the first MKMS 112 and the second MKMS 118 is approved at block 750. The first MKMS 112 and the second MKMS 118 may create the sequence of cryptographic keys based on the MKMS key for use between the first application 108 and the second application 114. This results in communication between the first application 108 of the first computing device 102 to the second application 114 of the second computing device 104 using the sequence of cryptographic keys based on the MKMS key.

According to some examples, the first certificate comprises a first ordered list of permissible elliptical curve algorithm values and the second certificate comprises a second ordered list of permissible elliptical curve algorithm values. The permissible elliptical curve algorithm values may be at least one of X25519 and X448 or another algorithm.

According to some examples, the method 700 includes comparing the first MGroup identifier with the second MGroup rule and confirming that the first MGroup identifier is present in a list of allowable identifiers associated with the second MGroup rule.

According to some examples, the method 700 includes comparing the second MGroup identifier with the first MGroup rule and confirming that the second MGroup identifier is present in a list of allowable identifiers associated with the first MGroup rule.

According to some examples, the method 700 includes comparing the first MGroup identifier with the second MGroup rule and confirming that the first MGroup identifier is present in a list of allowable identifiers associated with the second MGroup rule and comparing the second MGroup identifier with the first MGroup rule and confirming that the second MGroup identifier is present in a list of allowable identifiers associated with the first MGroup rule.

According to some examples, the method 700 includes signing, by a command and control server computing device 301, the first certificate 312 and signing, by the command and control server computing device 301, the second certificate 318. The command and control server computing device 301 may authorize the communicating between the first application 108 of the first computing device 102 to the second application 114 of the second computing device 104 using the sequence of cryptographic keys based on the MKMS key.

According to some examples, the method 700 includes establishing a TLS session using the sequence of cryptographic keys based on the MKMS key.

According to some examples, the method 700 includes issuing, by the command and control server computing device 301, a replacement first certificate for the first certificate 312 and a replacement second certificate for the second certificate 318. In some cases, the replacement first certificate may have at least one of a different first MGroup identifier and a different first MGroup rule from the first MGroup identifier and the first MGroup rule of the first certificate 312. In addition, the replacement second certificate may have at least one of a different second MGroup identifier and a different second MGroup rule from the second MGroup identifier and the second MGroup rule of the second certificate 318.

According to some examples, the method 700 includes sending, by the command and control server computing device 301, a certificate revocation list to the first MKMS 112 and the second MKMS 118 having a list of revoked certificates.

As another example, there may be the first computing device 102, the second computing device 104, and a third computing device. After the first computing device 102 and the second computing device 104 are authorized to communicate with one another, the third computing device may request a sequence of cryptographic keys from a third MKMS based on the MKMS key. A third application executed by the third computing device may receive a message from the second application 114 only if the first application 108 is authorized to communicate with the third application. In addition, the message may be communicated from the first application 108 to the second application 114 only if the first application 108 is authorized to communicate with the second application 114 and the message may be communicated from the second application 114 to the third application only if the second application 114 is authorized to communicate with the third application. In addition, the message may be communicated from the second application 114 to the third application only if the first application 108 is authorized to communicate with the third application.

Application Programming Interface (API) Security

An Application Programming Interface (API) is a structured means of communication. An API may have a producer that sends messages to one or more consumers who receive the messages. The consumer may offer one or more replies. In one example, the producer may be the first computing device 102 or another computing device. The consumer may be the second computing device 104 or another computing device.

Figure 8:
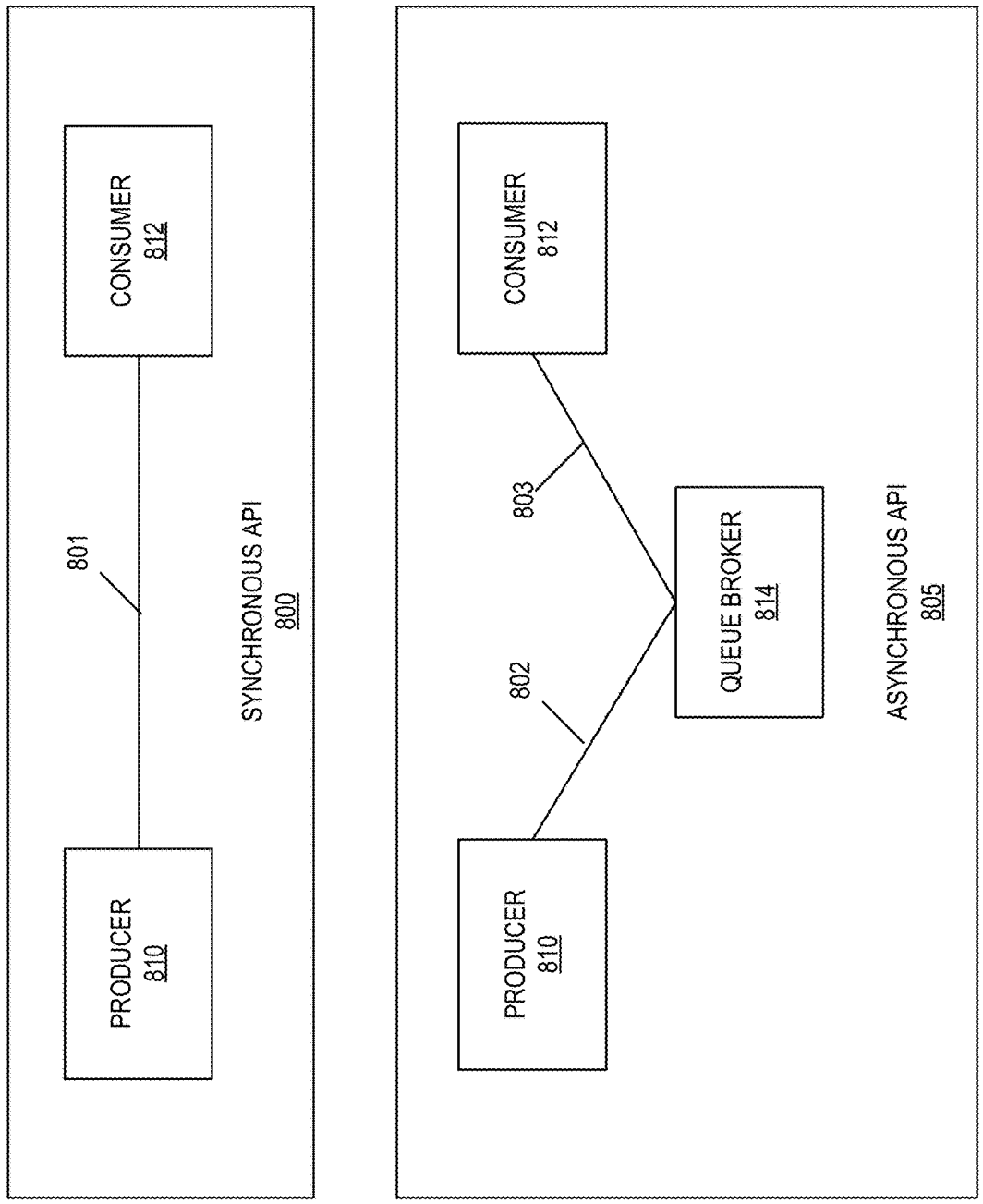
FIG. 8 is a block diagram of application programming interface (API) security according to an example of the instant disclosure.

There are two classes of APIs including synchronous and asynchronous as shown in FIG. 8. A synchronous API 800 may be a direct connection from a producer 810 to a consumer 812. The producer 810 may wait for a reply from the consumer 812. In an asynchronous API 805, the producer 810 may send a message without waiting for a reply. The consumer 812 receives messages and returns replies. Subsequently, the producer 810 may receive zero or more replies from the consumer 812. A typical way of implementing an asynchronous API may be using a queue and a queue broker 814. The producer 810 may deposit a message on the queue, which one or more consumers 812 may eventually read. The consumer 812 may reply by returning messages to the queue, which the producer 810 subsequently reads.

Securing a synchronous API 805 may typically leverage a token, an unexpiring key or password known as an API key, or a digital signature over data communicated in the synchronous API 800. The producer 810 may send the token, API key, or digital signature at the application layer in the message. If an adversary were to discover the token, API key, or digital signature, the adversary could gain the ability to masquerade as the producer. The API architecture may protect against token, API key, or digital signature theft using TLS encryption at the transport layer.

The conventional way of securing a synchronous API 800 does not work well for an asynchronous API 805. In a synchronous API, the producer 810 and consumer 812 share a direct connection and may operate under a real-time latency assumption. In order to mitigate the possibility of token theft, in a synchronous API the token may have a relatively short time to live. In contrast, no real-time assumption may exist in many asynchronous APIs. The consumer 812, for example, may be down or unavailable during the time of transmission and may have to reboot before receiving the message from the API. Additionally, security best practices may recommend against storing the token, API key, or digital signature on a queue due to increased risk of attack. As a result, few synchronous APIs may utilize security methods such as OAuth or OIDC tokens or digital signatures.

API Over mTLS with Authorization

API security may be increased or upgraded so that neither the producer 810 or consumer 812 have to refactor code. In other words, the producer 810 and the consumer 812 may communicate using existing APIs in both synchronous and asynchronous cases.

All transmissions using the API may communicate over mTLS. In a synchronous API, the system may enforce mTLS between the producer 810 and the consumer 812 for both the request and the reply. In an asynchronous API, the system may enforce mTLS between the producer 810 to the trusted queue broker 814 as well as between the trusted queue broker 814 to the consumer 812. The mTLS channels may ensure that an adversary cannot insert a fraudulent intermediary.

The producer 810 and the consumer 812 may communicate only if authorized. Both synchronous and asynchronous APIs may automatically enforce authorization regardless of any additional authorization implemented at the application layer through OAuth or OpenID (OIDC) tokens or using other methods. Successful communication between the producer 810 and the consumer 812 may occur only if authorized.

Each peer may receive both an original message and a peer's certificate. Each peer may use information in the certificate to implement fine-grained authorization. The certificate may contain the MKMSID of the peer that can be used as a SubjectID. The recipient can use the MKMSID to look up or review entitlements. The consumer 812 may receive the certificate of the producer 810 in either the synchronous or asynchronous API. The consumer 812 may use the certificate of the producer 810 to perform fine-grained authorization.

Authentication and Authorization Data

The system 100 may provision both user and connection data to the command and control server computing device 301. User data may include a role and additional contextual information such as a business unit and enterprise. When the producer 810 sends a message over either a synchronous API or asynchronous API, the consumer 812 may not receive the message unless authorized by the command and control server computing device 301. Conversely, when the producer 810 sends a reply to the consumer 812, the consumer 812 may not receive the message unless authorized by the command and control server computing device 301. Additionally, the recipient of the message may utilize metadata. For example, the consumer 812 may execute a database read operation, but only on data in a producer's business unit.

In some examples, at the transport layer, the system 100 may authenticate and authorize connection 801, connection 802, and connection 803. The system 100 may block or restrict communication if authentication and/or authorization fails.

Synchronous API

At the time of the TLS handshake, the system 100 may automatically authenticate the first certificate 312 and the second certificate 318. Additionally, within the TLS handshake, the system may check and ensure that two peers are authorized to connect.

The system 100 may provide the option to increase or upgrade security using Role Based Access Control (RBAC). While the TLS connection is open, the consumer 812 may query the second TLS library 116 for connection information such as the first certificate 312 and the second certificate 318. While the TLS connection is open, the producer 810 may query the first TLS library 110 for connection information such as the first certificate 312 and the second certificate 318. The producer 810 and consumer 812 may additionally query the command and control server computing device 301 by providing the command and control server computing device 301 information obtained from parsing the first certificate 312 and the second certificate 318. The command and control server computing device 301 may reply by sending roles and other data associated with information found in the certificates such as the MKMSIDs. In some examples, roles and other data are provisioned to the command and control server computing device 301 which may be subsequently sent to the MKMSs upon receipt of requests that include the certificates. In some examples, the roles and other data sent from the command and control server computing device 301 to the consumer 812 is encoded in an OAuth or OIDC token.

Asynchronous API

In the asynchronous API 805, the producer 810 may post messages to the queue broker 814 and the consumer 812 may read from the queue. Replies are reversed.

When the queue broker 814 receives the message from the producer 810, the queue broker 814 interrogates the TLS library metadata API to pull the producer's certificate (e.g., the first certificate 312) used in the mTLS connection. The queue broker 814 can insert the producer's certificate into the message's metadata.

When the consumer 810 reads from the queue broker 814, the consumer 810 may first open the connection 803. The connection 803 only may open if authorized through the use of certificates. After the connection 803 is established, the queue broker 814 may query its TLS library for the certificate of the consumer 810. At this point, the queue broker 814 has both the producer's certificate 312 obtained from the message's meta-data and the consumer's certificate 318 obtained from the TLS connection 803. The queue broker 814 may perform the same authorization checks using the consumer's certificate and the producer's certificate that the TLS libraries would have performed if the connection were a synchronous API 800.

In other words, the queue broker 814 may validate MGroup rules in the two certificates 312 and 318 in order to perform multidimensional authorization. If the authorization succeeds, the queue broker 814 may send the requested message over the connection 803. If the authorization fails, the queue broker 814 does not send the requested message. Upon receipt, the consumer 812 may query the meta-data of the message to obtain the producer's 810 certificate. The consumer 812 may query the command and control server computing device 301 to obtain authorization information and other data. In some examples, the command and control server computing device 301 sends the authorization information and other data in an OAUTH or OIDC token.

Inventory

API security may be associated with maintaining an inventory. The MKMSs automatically log every connection through visibility. Through log analysis, the inventory may be automatically produced and sorted by MKMS attributes. For example, a report may produce an API inventory for each of production, pre-production, test, and development regions. In this present example, the list of connections is the API inventory.

Serverless Functions

As an example, an architecture may leverage serverless functions (e.g., AWS LAMBDA, MICROSOFT AZURE). A serverless function may be used to isolate logic such as business logic from underlying infrastructure to allow focus on business logic as opposed to environmental, hardware, or compute concerns. The serverless function may not provide always-on availability, so serverless functions may typically consume asynchronous APIs. Additionally, a network architect may install a web application firewall (WAF) in front of the serverless function to inspect API messages so that developers can isolate business logic on the serverless function in order to reduce need for argument validation in the message.

Figure 9:
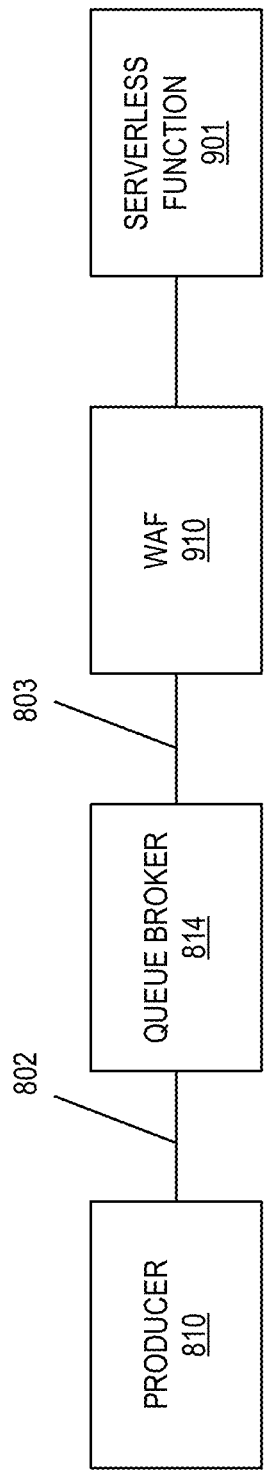
FIG. 9 is a block diagram of a serverless function using the API security according to an example of the instant disclosure.

FIG. 9 shows an example associated with serverless functions. The producer 810 may invoke the asynchronous API 805 by posting messages to the queue broker 814 over connection 802. A serverless function 901 may read from the queue by communication through the web application firewall (WAF) 910 and the WAF 910 may connect to the queue broker 814 over the connection 803. The asynchronous API security solution shown in FIG. 9 may ensure that the WAF 910 only receives messages from the producer 810 if authorized. Since the WAF 910 is a reverse proxy, the WAF 910 may return the message to the serverless function 901 along with any additional metadata. The WAF 910 and the serverless function 901 may be in a segment isolated by firewalls or network security groups for added security.

Figure 10:
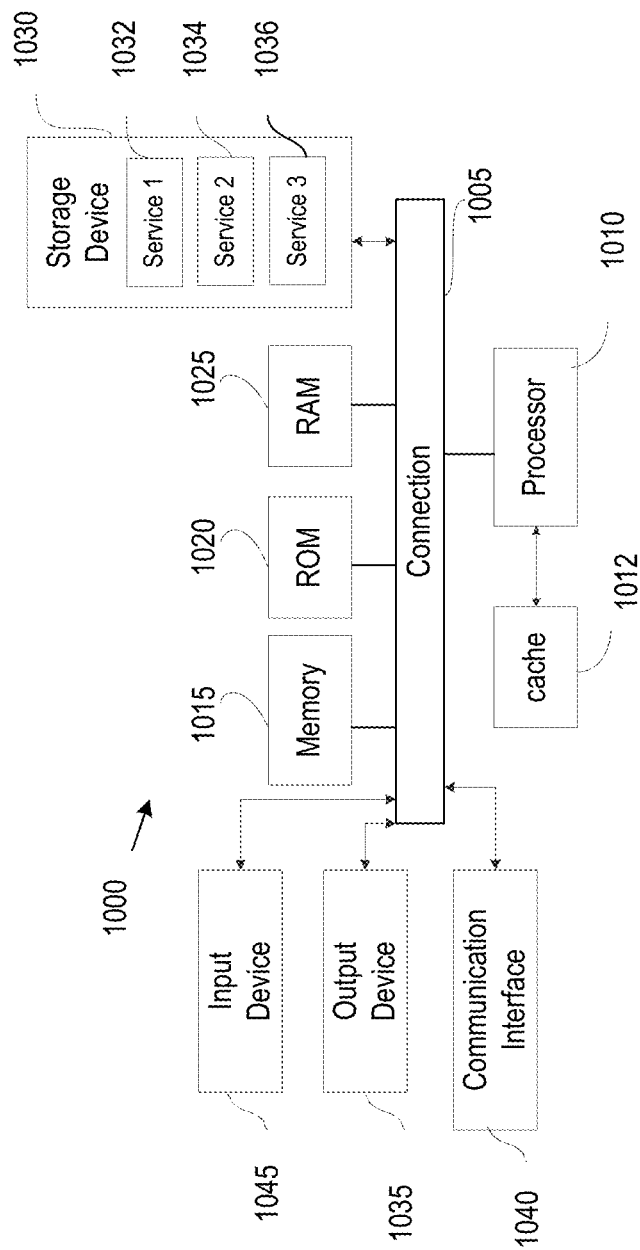
FIG. 10 shows an example of a system for implementing certain aspects of the present technology according to an example of the instant disclosure.

FIG. 10 shows an example of computing system 1000, which can be for example any computing device making up the first computing device 102, the second computing device 104, the command and control server computing device 301, the producer 810, the consumer 812, or any component thereof in which the components of the system are in communication with each other using connection 1005. Connection 1005 can be a physical connection via a bus, or a direct connection into processor 1010, such as in a chipset architecture. Connection 1005 can also be a virtual connection, networked connection, or logical connection.

In some embodiments, computing system 1000 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1000 includes at least one processing unit (CPU or processor) 1010 and connection 1005 that couples various system components including system memory 1015, such as read-only memory (ROM) 1020 and random access memory (RAM) 1025 to processor 1010. Computing system 1000 can include a cache of high-speed memory 1012 connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms known to those of skill in the art. In some instances, multimodal systems can enable a user to provide multiple types of input/output to communicate with computing system 1000. Computing system 1000 can include communications interface 1040, which can generally govern and manage the user input and system output. There is no restriction on operating on any particular hardware arrangement, and therefore the basic features here may easily be substituted for improved hardware or firmware arrangements as they are developed.

Storage device 1030 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 1030 can include software services, servers, services, etc., that when the code that defines such software is executed by the processor 1010, it causes the system to perform a function. In some embodiments, a hardware service that performs a particular function can include the software component stored in a computer-readable medium in connection with the necessary hardware components, such as processor 1010, connection 1005, output device 1035, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Illustrative examples of the disclosure include:

Aspect 1: A method comprising: requesting, by a first computing device having a first application and a first transport layer security (TLS) library, a sequence of cryptographic keys from a first mutual key management service (MKMS), the sequence of cryptographic keys based on an MKMS key, requesting, by a second computing device having a second application and a second TLS library, the sequence of cryptographic keys from a second MKMS, the sequence of cryptographic keys based on the MKMS key, performing, by the first MKMS having a first certificate and the second MKMS having a second certificate, an authorization, the first certificate having a first MGroup rule and the second certificate having a second MGroup identifier, comparing, by one of the first MKMS and the second MKMS, the second MGroup identifier with the first MGroup rule, and determining that the authorization between the first MKMS and the second MKMS is approved, the first MKMS and the second MKMS creating the sequence of cryptographic keys based on the MKMS key, and communicating between the first application of the first computing device to the second application of the second computing device using the sequence of cryptographic keys based on the MKMS key.

Aspect 2: The method of Aspect 1, further comprising one of comparing a first MGroup identifier with a second MGroup rule and confirming that the first MGroup identifier is present in a list of allowable identifiers associated with the second MGroup rule and comparing the second MGroup identifier with the first MGroup rule and confirming that the second MGroup identifier is present in a list of allowable identifiers associated with the first MGroup rule.

Aspect 3: The method of Aspects 1 and 2, further comprising comparing a first MGroup identifier with a second MGroup rule and confirming that the first MGroup identifier is present in a list of allowable identifiers associated with the second MGroup rule and comparing the second MGroup identifier with the first MGroup rule and confirming that the second MGroup identifier is present in a list of allowable identifiers associated with the first MGroup rule.

Aspect 4: The method of any of Aspects 1 to 3, wherein at least one of a first MGroup identifier comprises a group identifier from at least one dimension and the second MGroup identifier comprises a group identifier from at least one dimension.

Aspect 5: The method of any of Aspects 1 to 4, wherein the first certificate comprises a first ordered list of permissible elliptical curve algorithm values and the second certificate comprises a second ordered list of permissible elliptical curve algorithm values.

Aspect 6: The method of any of Aspects 1 to 5, wherein the permissible elliptical curve algorithm values comprise at least one of X25519 and X448.

Aspect 7: The method of any of Aspects 1 to 6, further comprising signing the first certificate and signing the second certificate.

Aspect 8: The method of any of Aspects 1 to 7, further comprising establishing a TLS session using the sequence of cryptographic keys based on the MKMS key.

Aspect 9: The method of any of Aspects 1 to 8, further comprising issuing a replacement first certificate for the first certificate and a replacement second certificate for the second certificate.

Aspect 10: The method of any of Aspects 1 to 9, wherein the replacement first certificate has at least one of a different first MGroup identifier and a different first MGroup rule from a first MGroup identifier and the first MGroup rule of the first certificate.

Aspect 11: The method of any of Aspects 1 to 10, wherein the replacement second certificate has at least one of a different second MGroup identifier and a different second MGroup rule from the second MGroup identifier and a second MGroup rule of the second certificate.

Aspect 12: The method of any of Aspects 1 to 11, further comprising sending a certificate revocation list to the first MKMS and the second MKMS having a list of revoked certificates.

Aspect 13: The method of any of Aspects 1 to 12, wherein the first computing device comprises a producer and the second computing device comprises a consumer, and the producer and consumer communicate using a synchronous application programming interface (API).

Aspect 14: The method of any of Aspects 1 to 13, further comprising requesting, by a third computing device having a third application and a third TLS library, a different sequence of cryptographic keys from a third MKMS, the sequence of different cryptographic keys based on the MKMS key.

Aspect 15: The method of any of Aspects 1 to 14, wherein the third application receives a message from the second application only if the first application is authorized to communicate with the third application.

Aspect 16: The method of any of Aspects 1 to 15, wherein the second application receives a message from the first application only if the first application is authorized to communicate with the second application.

Aspect 17: The method of any of Aspects 1 to 16, wherein the third application receives a message from the second application only if the second application is authorized to communicate with the third application.

Aspect 18: The method of any of Aspects 1 to 17, wherein the third application receives a message from the second application only if the first application is authorized to communicate with the third application.

Aspect 19: A system including a first computing device having a memory, at least one processor, a first application, and a first transport layer security (TLS) library, the first computing device to request a sequence of cryptographic keys from a first mutual key management service (MKMS), the sequence of cryptographic keys based on an MKMS key, a second computing device having a memory, at least one processor, a second application, and a second TLS library, the second computing device to request the sequence of cryptographic keys from a second MKMS, the sequence of cryptographic keys based on the MKMS key, the first MKMS having a first certificate having a first MGroup rule, the second MKMS having a second certificate having a second MGroup identifier, one of the first MKMS and the second MKMS to perform an authorization by comparing the second MGroup identifier with the first MGroup rule, and the first MKMS and the second MKMS to determine that the authorization between the first MKMS and the second MKMS is approved and allow communication between the first application of the first computing device to the second application of the second computing device using the sequence of cryptographic keys based on the MKMS key, the first MKMS and the second MKMS creating the sequence of cryptographic keys based on the MKMS key.

Aspect 20: A non-transitory computer-readable storage medium, having instructions stored thereon that, when executed by at least one computing device cause the at least one computing device to perform operations, the operations including requesting, by a first computing device having a first application and a first transport layer security (TLS) library, a sequence of cryptographic keys from a first mutual key management service (MKMS), the sequence of cryptographic keys based on an MKMS key, requesting, by a second computing device having a second application and a second TLS library, the sequence of cryptographic keys from a second MKMS, the sequence of cryptographic keys based on the MKMS key, performing, by the first MKMS having a first certificate and the second MKMS having a second certificate, an authorization, the first certificate having a first MGroup rule and the second certificate having a second MGroup identifier, comparing, by one of the first MKMS and the second MKMS, the second MGroup identifier with the first MGroup rule, and determining that the authorization between the first MKMS and the second MKMS is approved, the first MKMS and the second MKMS creating the sequence of cryptographic keys based on the MKMS key, and communicating between the first application of the first computing device to the second application of the second computing device using the sequence of cryptographic keys based on the MKMS key.

Aspect 21: A method comprising: requesting, by a first computing device having a first application and a first certificate a sequence of cryptographic keys from a first mutual key management service (MKMS), the sequence of cryptographic keys based on an MKMS key and stored in a first TLS library, requesting by a second computing device having a second application and a second certificate the sequence of cryptographic keys from a second MKMS, the sequence of cryptographic keys based on the MKMS key and stored in the second TLS library, requesting by a third computing device having a third application and a third certificate a different sequence of cryptographic keys from a third MKMS, the sequence of cryptographic keys based on the MKMS key and stored in the third TLS library, communicating a message from the first computing device to the second computing device based upon authentication and authorization information found in the first and second certificate, communicating the message from the second computing device to the third computing device based upon authentication and authorization information found in the second and third certificate, and communicating the message from the second computing device to the third computing device based upon authentication and authorization information found in the first and third certificate.

What is claimed is:

1. A method comprising:
   requesting, by a first computing device having a first application and a first transport layer security (TLS) library, a sequence of cryptographic keys from a first mutual key management service (MKMS), the sequence of cryptographic keys based on an MKMS key;

requesting, by a second computing device having a second application and a second TLS library, the sequence of cryptographic keys from a second MKMS, the sequence of cryptographic keys based on the MKMS key;

performing, by the first MKMS having a first certificate and the second MKMS having a second certificate, an authorization, the first certificate having a first MGroup rule and the second certificate having a second MGroup identifier;

comparing, by one of the first MKMS and the second MKMS, the second MGroup identifier with the first MGroup rule; and determining that the authorization between the first MKMS and the second MKMS is approved, the first MKMS and the second MKMS creating the sequence of cryptographic keys based on the MKMS key, and communicating between the first application of the first computing device to the second application of the second computing device using the sequence of cryptographic keys based on the MKMS key.

2. The method of claim 1, further comprising one of comparing a first MGroup identifier with a second MGroup rule and confirming that the first MGroup identifier is present in a list of allowable identifiers associated with the second MGroup rule and comparing the second MGroup identifier with the first MGroup rule and confirming that the second MGroup identifier is present in a list of allowable identifiers associated with the first MGroup rule.

3. The method of claim 1, further comprising comparing a first MGroup identifier with a second MGroup rule and confirming that the first MGroup identifier is present in a list of allowable identifiers associated with the second MGroup rule and comparing the second MGroup identifier with the first MGroup rule and confirming that the second MGroup identifier is present in a list of allowable identifiers associated with the first MGroup rule.

4. The method of claim 1, wherein at least one of a first MGroup identifier comprises a group identifier from at least one dimension and the second MGroup identifier comprises a group identifier from at least one dimension.

5. The method of claim 1, wherein the first certificate comprises a first ordered list of permissible elliptical curve algorithm values and the second certificate comprises a second ordered list of permissible elliptical curve algorithm values.

6. The method of claim 5, wherein the permissible elliptical curve algorithm values comprise at least one of X25519 and X448.

7. The method of claim 1, further comprising signing the first certificate and signing the second certificate.

8. The method of claim 1, further comprising establishing a TLS session using the sequence of cryptographic keys based on the MKMS key.

9. The method of claim 1, further comprising issuing a replacement first certificate for the first certificate and a replacement second certificate for the second certificate.

10. The method of claim 9, wherein the replacement first certificate has at least one of a different first MGroup identifier and a different first MGroup rule from a first MGroup identifier and the first MGroup rule of the first certificate.

11. The method of claim 9, wherein the replacement second certificate has at least one of a different second MGroup identifier and a different second MGroup rule from the second MGroup identifier and a second MGroup rule of the second certificate.

12. The method of claim 1, further comprising sending a certificate revocation list to the first MKMS and the second MKMS having a list of revoked certificates.

13. The method of claim 1, wherein the first computing device comprises a producer and the second computing device comprises a consumer, and the producer and consumer communicate using a synchronous application programming interface (API).

14. The method of claim 1, further comprising requesting, by a third computing device having a third application and a third TLS library, a different sequence of cryptographic keys from a third MKMS, the sequence of different cryptographic keys based on the MKMS key.

15. The method of claim 14, wherein the third application receives a message from the second application only if the first application is authorized to communicate with the third application.

16. The method of claim 14, wherein the second application receives a message from the first application only if the first application is authorized to communicate with the second application.

17. The method of claim 14, wherein the third application receives a message from the second application only if the second application is authorized to communicate with the third application.

18. The method of claim 14, wherein the third application receives a message from the second application only if the first application is authorized to communicate with the third application.

19. A system comprising:
a first computing device having a memory, at least one processor, a first application, and a first transport layer security (TLS) library, the first computing device to request a sequence of cryptographic keys from a first mutual key management service (MKMS), the sequence of cryptographic keys based on an MKMS key;
a second computing device having a memory, at least one processor, a second application, and a second TLS library, the second computing device to request the sequence of cryptographic keys from a second MKMS, the sequence of cryptographic keys based on the MKMS key;
the first MKMS having a first certificate having a first MGroup rule;
the second MKMS having a second certificate having a second MGroup identifier;
one of the first MKMS and the second MKMS to perform an authorization by comparing the second MGroup identifier with the first MGroup rule; and
the first MKMS and the second MKMS to determine that the authorization between the first MKMS and the second MKMS is approved and allow communication between the first application of the first computing device to the second application of the second computing device using the sequence of cryptographic keys based on the MKMS key, the first MKMS and the second MKMS creating the sequence of cryptographic keys based on the MKMS key.

20. A non-transitory computer-readable storage medium, having instructions stored thereon that, when executed by at least one computing device cause the at least one computing device to perform operations, the operations comprising:
requesting, by a first computing device having a first application and a first transport layer security (TLS) library, a sequence of cryptographic keys from a first mutual key management service (MKMS), the sequence of cryptographic keys based on an MKMS key;
requesting, by a second computing device having a second application and a second TLS library, the sequence of cryptographic keys from a second MKMS, the sequence of cryptographic keys based on the MKMS key;
performing, by the first MKMS having a first certificate and the second MKMS having a second certificate, an authorization, the first certificate having a first MGroup rule and the second certificate having a second MGroup identifier;
comparing, by one of the first MKMS and the second MKMS, the second MGroup identifier with the first MGroup rule; and
determining that the authorization between the first MKMS and the second MKMS is approved, the first MKMS and the second MKMS creating the sequence of cryptographic keys based on the MKMS key, and communicating between the first application of the first computing device to the second application of the second computing device using the sequence of cryptographic keys based on the MKMS key.

* * * * *